(12) United States Patent
Ikriannikov et al.

(10) Patent No.: US 12,057,767 B2
(45) Date of Patent: Aug. 6, 2024

(54) SWITCHING POWER CONVERTERS INCLUDING INJECTION STAGES, AND ASSOCIATED METHODS

(71) Applicant: Maxim Integrated Products, Inc., San Jose, CA (US)

(72) Inventors: Alexandr Ikriannikov, San Jose, CA (US); Alberto Giovanni Viviani, Mountain View, CA (US)

(73) Assignee: Maxim Integrated Products, Inc., San Jose, CA (US)

( * ) Notice: Subject to any disclaimer, the term of this patent is extended or adjusted under 35 U.S.C. 154(b) by 309 days.

(21) Appl. No.: 17/658,165

(22) Filed: Apr. 6, 2022

(65) Prior Publication Data

US 2022/0368214 A1    Nov. 17, 2022

Related U.S. Application Data

(60) Provisional application No. 63/187,828, filed on May 12, 2021.

(51) Int. Cl.
*H02M 3/158* (2006.01)
*H02M 1/08* (2006.01)
*H02M 1/14* (2006.01)

(52) U.S. Cl.
CPC ............. *H02M 1/143* (2013.01); *H02M 1/08* (2013.01); *H02M 3/1584* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 1/143; H02M 3/156; H02M 3/157; H02M 3/158; H02M 3/1584; H02M 3/1586; H02M 3/285; H02M 7/49; H02M 1/045; H02M 7/006; H02M 7/06;

(Continued)

(56) References Cited

U.S. PATENT DOCUMENTS 4,703,409 A    10/1987  Spreen
7,554,820 B2 *  6/2009  Stanley ............ H02M 7/53871
                                                363/56.08

(Continued)

*Primary Examiner* — Jeffrey A Gblende
(74) *Attorney, Agent, or Firm* — PdZ Patent Law, PLLC

(57) ABSTRACT

A method for operating a switching power converter to reduce ripple current magnitude includes controlling duty cycle of a plurality power stages of the switching power converter to regulate at least one parameter of the switching power converter. Each power stage includes a respective power transfer winding that is magnetically coupled to the respective power transfer winding of each other power stage. The method further includes controlling an injection stage of the switching power converter to reduce voltage across a respective leakage inductance of each power transfer winding. The injection stage includes an injection winding that is magnetically coupled to each power transfer winding.

20 Claims, 27 Drawing Sheets

(58) Field of Classification Search
CPC ........ H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 1/007; H02M 1/0009; H02M 3/1588; H02M 7/5395; H02M 1/14; H02M 1/0043; Y02B 70/1491; H02J 3/46; H02J 3/38

See application file for complete search history.

(56) References Cited

U.S. PATENT DOCUMENTS

| | | | |
|---|---|---|---|
| 8,102,233 | B2 | 1/2012 | Ikriannikov |
| 8,237,530 | B2 | 8/2012 | Ikriannikov |
| 8,772,967 | B1 | 7/2014 | Ikriannikov et al. |
| 9,019,063 | B2 | 4/2015 | Ikriannikov |
| 9,774,259 | B1 | 9/2017 | Ikriannikov et al. |
| 9,819,275 | B2 * | 11/2017 | Otake ................ H02M 3/01 |
| 2022/0173652 | A1 * | 6/2022 | Kusama ............ H02M 3/33584 |

* cited by examiner

SWITCHING POWER CONVERTERS INCLUDING INJECTION STAGES, AND ASSOCIATED METHODS

RELATED APPLICATIONS

This application claims benefit of priority to U.S. Provisional Patent Application Ser. No. 63/187,828, filed on May 12, 2021, which is incorporated herein by reference.

BACKGROUND

Inductors are commonly used for energy storage in switching power converters. Some switching converters include one or more discrete inductors, where a discrete inductor is an inductor that is not magnetically coupled to any other inductor. Other switching power converters include one or more coupled inductors, where a coupled inductor is a device including two or more inductors that are magnetically coupled. A coupled inductor exhibits magnetizing inductance, which is inductance associated with magnetic flux linking all windings of the coupled inductor. Additionally, each winding of a coupled inductor exhibits leakage inductance, which is inductance associated with magnetic flux that links only the winding, i.e., magnetic flux that does not couple to any other winding. As known in the art, use of a coupled inductor in place of two or more discrete inductors in a switching power converter can achieve significant advantages, such as reduced ripple current magnitude and/or improved transient response.

DETAILED DESCRIPTION OF THE EMBODIMENTS

Figure 1:
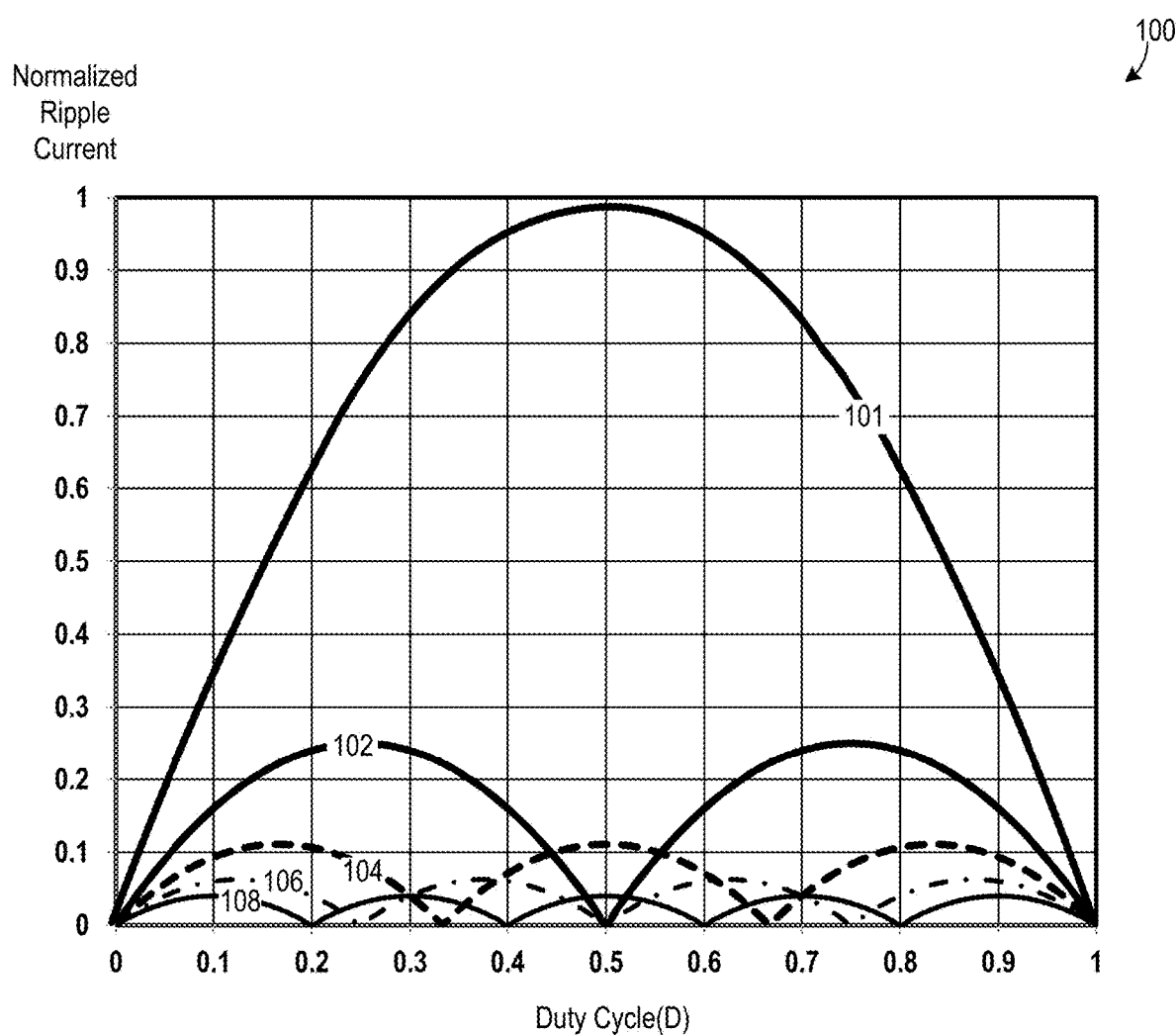
FIG. 1 is a graph of normalized ripple current magnitude versus duty cycle for five different switching power converters.

A multiphase switching power converter including a coupled inductor can operate in a manner which minimizes, or even essentially eliminates, ripple current magnitude. For example, FIG. 1 is a graph 100 of normalized ripple current magnitude in one phase versus duty cycle for five switching power converters. Curve 101 corresponds to a single-phase switching power converter, curve 102 corresponds to a two-phase switching power converter, curve 104 corresponds to a three-phase switching power converter, curve 106 corresponds to a four-phase switching power converter, and curve 108 corresponds to a five-phase switching power converter. The single-phase switching power converter includes a discrete inductor. Each of the multi-phase switching power converters includes a coupled inductor with leakage inductance values equal to an inductance value of the discrete inductor of the single-phase switching power converter. Ripple current magnitude is normalized relative to a maximum ripple current magnitude of the single-phase switching power converter (which occurs at a duty cycle of 0.5). Graph 100 assumes that the coupled inductor of each multi-phase switching power converter has essentially ideal magnetic coupling, i.e., magnetizing inductance is many times greater than leakage inductance of any one winding. All switching power converters of the FIG. 1 graph are assumed to operate at a common switching frequency.

As evident from FIG. 1, each switching power converter has one or more operating points where ripple current magnitude is essentially zero. For example, ripple current magnitude in the two-phase switching power converter is essentially zero when operating at 50 percent duty cycle, and ripple current magnitude in the three-phase switching power converter is essentially zero when operating at either 33 percent duty cycle or 66 percent duty cycle. However, each switching power converter also has operating points where ripple current magnitude is large, especially if the number of phases is small. For example, the two-phase switching power converter will have large ripple current magnitude when duty cycle is approximately either 25 percent or 75 percent, and the switching power converter with discrete inductors will have a large ripple current magnitude except when operating around zero duty cycle or around one hundred percent duty cycle.

Disclosed herein are switching power converters including injection stages which at least partially overcome the above-discussed drawbacks of conventional switching power converters. For example, certain embodiments of the new switching power converters have small ripple current magnitude at essentially any duty cycle, instead of at only certain duty cycles. Consequently, the new switching power converters may incur smaller losses than otherwise similar conventional switching power converters, due to their ability to operate at low ripple current magnitude over a wide range of duty cycles. Additionally, the low ripple current magnitude of the new switching power converters promotes low ripple voltage magnitude, thereby potentially enabling relaxed filtering requirements relative to conventional switching power converters. Furthermore, in particular embodiments, ripple current magnitude is determined by magnetizing inductance instead of by leakage inductances. Consequently, magnetizing inductance can be made large to minimize ripple current magnitude, without negatively impacting transient response, because magnetizing inductance does not impair transient response. In a conventional switching power converter, in contrast, ripple current magnitude is determined primarily by leakage inductance (or by discrete inductance if the converter does not include a coupled inductor). Ripple current magnitude can be decreased in a conventional switching power converter by increasing leakage/discrete inductance, but doing so degrades transient response.

Figure 2:
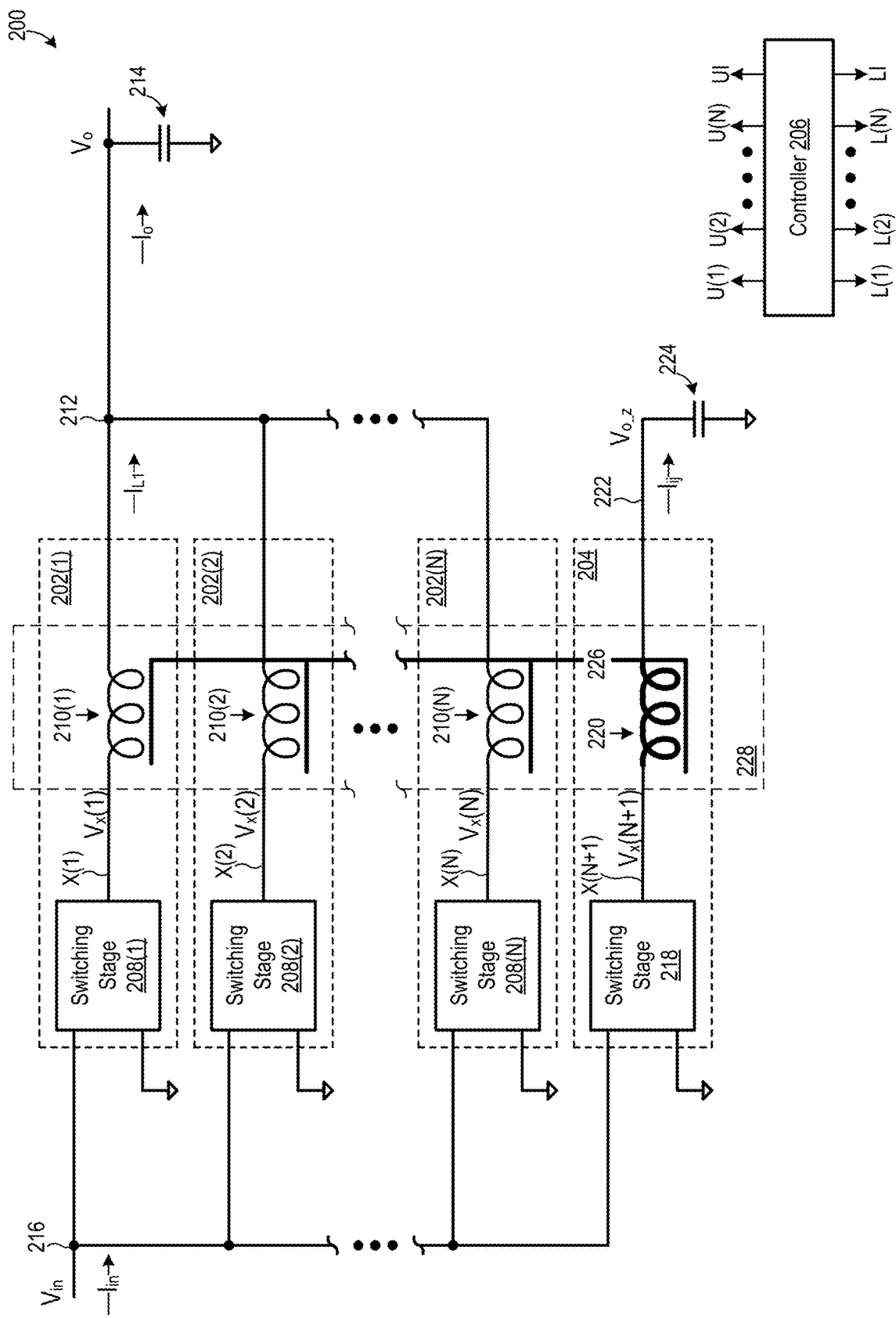
FIG. 2 is a schematic diagram of a multi-phase switching power converter including an injection stage, according to an embodiment.

FIG. 2 is a schematic diagram of a multi-phase switching power converter 200, which is one embodiment of the new switching power converters disclosed herein. Switching power converter 200 includes N power stages 202, an injection stage 204, and a controller 206, where N is an integer greater than one. In this document, specific instances of an item may be referred to by use of a numeral in parentheses (e.g., power stage 202(1)) while numerals without parentheses refer to any such item (e.g., power stages 202). Each power stage 202 corresponds to a respective phase of switching power converter 200, such that switching power converter 200 is an N-phase switching power converter.

Each power stage 202 includes a power switching stage 208 electrically coupled to a power transfer winding 210 at a switching node X. Each power transfer winding 210 is electrically coupled between the switching node X of its respective power stage 202 and a common output node 212. For example, power transfer winding 210(1) is electrically coupled between switching node X(1) and output node 212, and power transfer winding 210(2) is electrically coupled between switching node X(2) and output node 212. Output node 212 has a voltage $V_o$, and an output current $I_o$ flows to a load (not shown) electrically coupled to output node 212. Output current $I_o$ could have a negative polarity without departing from the scope hereof. One or more capacitors 214 are optionally electrically coupled to output node 212.

Each power switching stage 208 is configured to repeatedly switch the switching node X of its power stage 202 between an input power node 216 and ground, in response to control signals U and L generated by controller 206. Specifically, power switching stage 208(1) is configured to repeatedly switch node X(1) between input power node 216 and ground in response to control signals U(1) and L(1), power switching stage 208(2) is configured to repeatedly switch node X(2) between input power node 216 and ground in response to control signals U(2) and L(2), and so on. Input power node 216 is at a voltage $V_{in}$, and each power switching stage 208 accordingly repeatedly switches node X of its power stage 202 between voltage $V_{in}$ and zero volts relative to ground. An input current $I_{in}$ flows from an electrical power source (not shown) to switching power converter 200 via input power node 216. Input current $I_{in}$ could have a negative polarity without departing from the scope hereof. A given power transfer winding 210 in converter 200 is driven "high" when its respective switching node X is at voltage $V_{in}$, and the power transfer winding 210 is driven "low" when its respective switching node X is at zero volts relative to ground. For example, power transfer winding 210(1) is driven high when switching node X(1) is at voltage $V_{in}$, and power transfer winding 210(1) is driven low when switching node X(1) is at zero volts relative to ground.

Injection stage 204 includes an injection switching stage 218 electrically coupled to an injection winding 220 at a switching node X(N+1). Injection winding 220 is electrically coupled between switching node X(N+1) and injection output node 222. Injection output node 222, which is separate from output power node 212, is at a voltage $Y_{o\_z}$, and one or more capacitors 224 are electrically coupled to injection output node 222. Injection switching stage 218 is configured to repeatedly switch node X(N+1) between input power node 216 and ground in response to control signals UI and LI. Similar to power transfer windings 210, injection winding 220 is driven high when switching node X(N+1) is at voltage $V_{in}$, and injection winding 220 is driven low when switching node X(N+1) is at zero volts relative to ground. Injection stage 204 does not handle a direct current (DC) component of output current $I_o$. Instead, controller 206 controls injection stage 204 to reduce, or even essentially eliminate, alternating current (AC) voltage across leakage inductances of power transfer windings 210, as discussed below.

Figure 3:
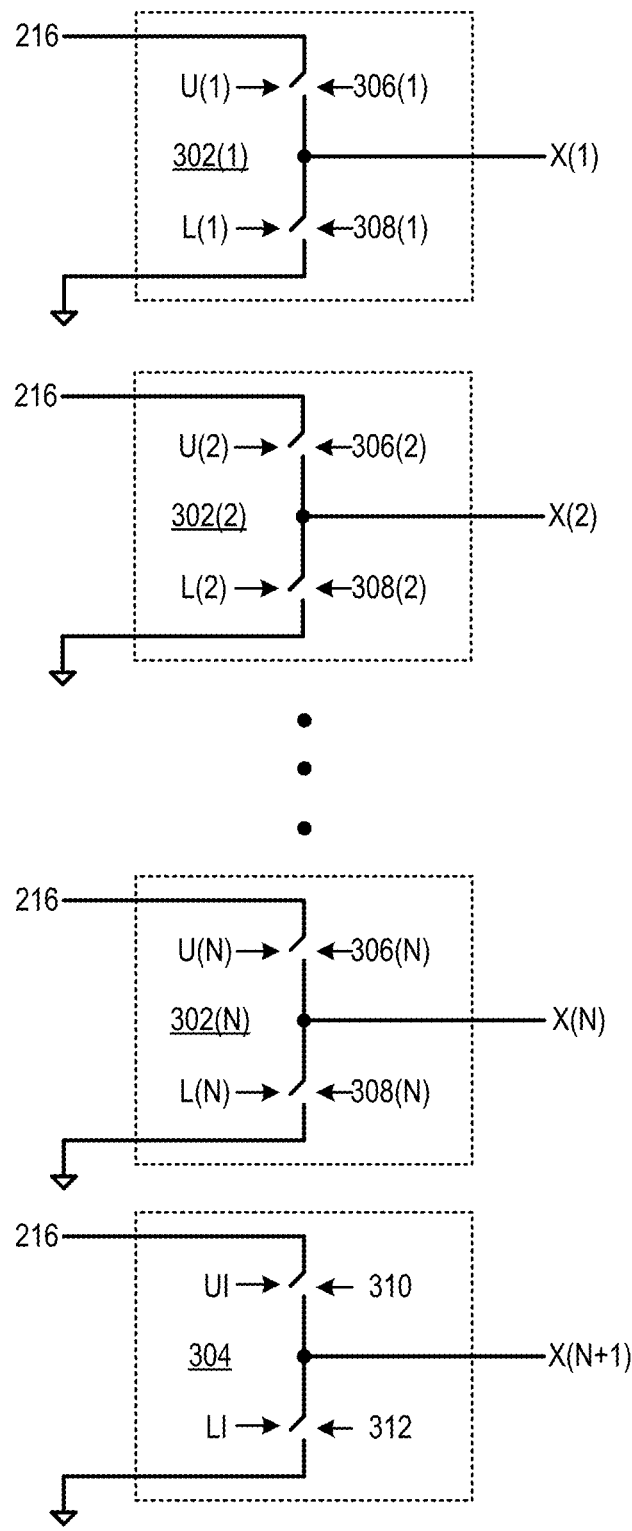
FIG. 3 is a schematic diagram one possible implementation of switching stages of the FIG. 2 switching power converter.

FIG. 3 illustrates one possible implementation of the switching stages of switching power converter 200. Specifically, FIG. 3 is a schematic diagram of N power switching stages 302 and an injection switching stage 304, where (a) power switching stages 302 are an embodiment of power switching stages 208 and (b) injection switching stage 304 is an embodiment of injection switching stage 218. Each power switching stage 302 includes an upper switching device 306 and a lower switching device 308. Each upper switching device 306 is electrically coupled between input power node 216 and the switching node X of its respective power stage. Each lower switching device 308 is electrically coupled between the switching node X of its respective power stage and ground. For example, upper switching device 306(1) is electrically coupled between input power node 216 and switching node X(1), and lower switching device 308(1) is electrically coupled between switching node (X1) and ground. Each upper switching device 306 switches in response to a respective control signal U from controller 206, and each lower switching device 308 switches in response to a respective control signal L from controller 206. For example, in some embodiments, each upper switching device 306 operates in its on (conductive) state when its respective control signal U is asserted, and the switching device operates in its off (non-conductive state) when its respective control signal U is de-asserted. Similarly, in some embodiments, each lower switching device 308 operates in its on (conductive) state when its respective control signal L is asserted, and the switching device operates in its off (non-conductive state) when its respective control signal L is de-asserted. Each switching device 306 and 308 includes, for example, one or more transistors.

Injection switching stage 304 includes an upper switching device 310 and a lower switching device 312. Upper switching device 310 is electrically coupled between input power node 216 and switching node X(N+1), and lower switching device 312 is electrically coupled between switching node X(N+1) and ground. Upper switching device 310 switches in response to control signal UI from controller 206, and lower switching device 312 switches in response to control signal LI from controller 206. For example, in certain embodiments, upper switching device 310 operates in its on (conductive) state when control signal UI is asserted, and the switching device operates in its off (non-conductive state) when its control signal UI is de-asserted. Similarly, in some embodiments, lower switching device 312 operates in its on (conductive) state when control signal LI is asserted, and the switching device operates in its off (non-conductive state) when control signal LI is de-asserted. Each switching device 310 and 312 includes, for example, one or more transistors. In some embodiments, upper switching device 310 has a smaller current carrying capability than each upper switching device 306, and lower switching device 312 has a smaller current carrying capability than each lower switching device 308, due to injection stage 204 not needing to handle the DC component of output current $I_o$.

Referring again to FIG. 2, power transfer windings 210 are magnetically coupled by a magnetic core 226, and injection winding 220 is magnetically coupled to each power transfer winding 210 by magnetic core 226. Power transfer windings 210, injection winding 220, and magnetic core 226 are part of a coupled inductor 228. Magnetic core 226 is formed, for example, of a ferrite magnetic material or an iron powder magnetic material. However, magnetic core 226 could alternately be an "air core," or in other words, magnetic core 226 could be implemented by placing windings 210 and 220, or breaking these windings in sections and placing these sections in pairs in sufficient proximity, to achieve magnetic coupling without use of a tangible magnetic coupling structure. Injection winding 220 is drawn with a heavier line weight than power transfer windings 210 to help a viewer distinguish injection winding 220 from power transfer windings 210. This difference in line weight should not be construed to imply that the configuration of injection winding 220 necessarily differs from the configuration of power transfer windings 210. The injection winding could actually be implemented with a smaller amount of conductor material because it has only AC ripple and does not carry any load current.

Controller 206 is implemented, for example, by analog and/or electronic circuitry. In some embodiments, controller 206 is at least partially implemented by a processor (not shown) executing instructions in the form of software and/or firmware stored in a memory (not shown). Although controller 206 is depicted as a discrete element for illustrative simplicity, controller 206 could be partially or fully integrated with one or more other elements of switching power converter 200. For example, some subsystems of controller 206 could be incorporated in one or more of power switching stages 208 and/or injection switching stage 218. Additionally, FIG. 2 should not be construed to require that there be a separate control bus for each control signal. For example, controller 206 could be implemented by a combination of a central integrated circuit and local control logic integrated in each switching stage 208 and 218, with a single control bus running from the central integrated circuit to each switching stage 208 and 218. Furthermore, controller 206 could be configured to derive control signal UI and LI from one or more of control signals U and L, such as by using logic circuitry, instead of by independently generating control signals UI and LI. Moreover, controller 206 may include multiple constituent elements that need not be co-packaged over even disposed at a common location.

Controller 206 is configured to generate control signals U and L to control duty cycle (D) of power stages 202, where duty cycle is a portion of a switching cycle that a power transfer winding 210 is driven high, to regulate at least one parameter of switching power converter 200. Examples of possible regulated parameters include, but are not limited, magnitude of input voltage $V_{in}$, magnitude of input current $I_{in}$, magnitude of output voltage $V_o$, and magnitude of output current $I_o$. For example, in some embodiments, controller 206 is configured to generate control signals U and L to regulate magnitude of output voltage $V_o$, and controller 206 accordingly generates control signals U and L during continuous conduction operation of switching power converter 200 such that duty cycle of power stages 202 is equal to a ratio of output voltage magnitude $V_o$ over input voltage magnitude $V_{in}$. For example, if output voltage $V_o$ is to be regulated to two volts and input voltage $V_{in}$ is eight volts, controller 206 would generate control signals U and L such that duty cycle of power stages 202 is 0.25. Controller 206 is optionally configured to generate control signals U and L such that power stages 202 switch out-of-phase with each other. For example, in some embodiments, controller 206 is configured to generate control signals U and L such that each power stage 202 switches 360/N degrees out of phase with an adjacent power stage 202 in the phase domain.

Figure 4:
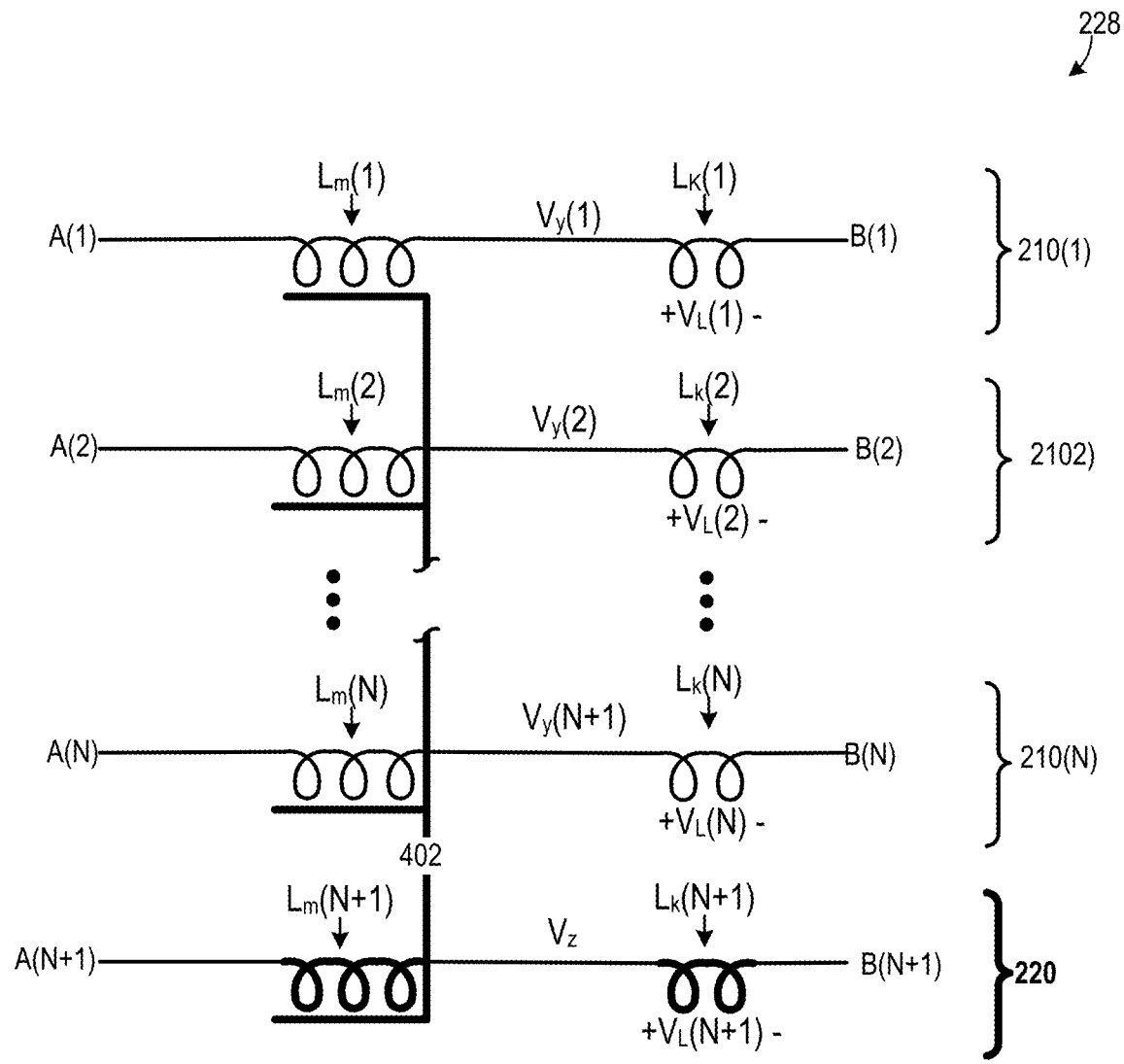
FIG. 4 is an electrical model of a coupled inductor of the FIG. 2 switching power converter.

Controller 206 is further configured to generate control signals UI and LI to control injection stage 204 such that the injection stage injects magnetic flux in magnetic core 226 in a manner which reduces voltage across a respective leakage inductance of each power transfer winding 210. Such reduction in voltage across leakage inductances advantageously reduces, or even essentially eliminates, magnitude of ripple current associated with charging and discharging of leakage inductances. To help appreciate this feature, refer to FIG. 4, which is an electrical model of coupled inductor 228. Each power transfer winding 210 exhibits a respective magnetizing inductance $L_m$ and a respective leakage inductance $L_k$. Similarly, injection winding 220 exhibits a magnetizing inductance $L_m(N+1)$ and a leakage inductance $L_m(N+1)$. Magnetizing inductances $L_m$ collectively form an ideal transformer with magnetic coupling symbolically shown by a magnetic core 402. When coupled inductor 228 is connected as shown in FIG. 2, each terminal A(1)-A(N+1) is electrically coupled to a respective switching node X, each terminal B(1)-B(N) is electrically coupled to output node 212, and terminal B(N+1) is electrically coupled to injection output node 222. However, coupled inductor 228 could be connected in other manners without departing from the scope hereof.

Figure 5A:
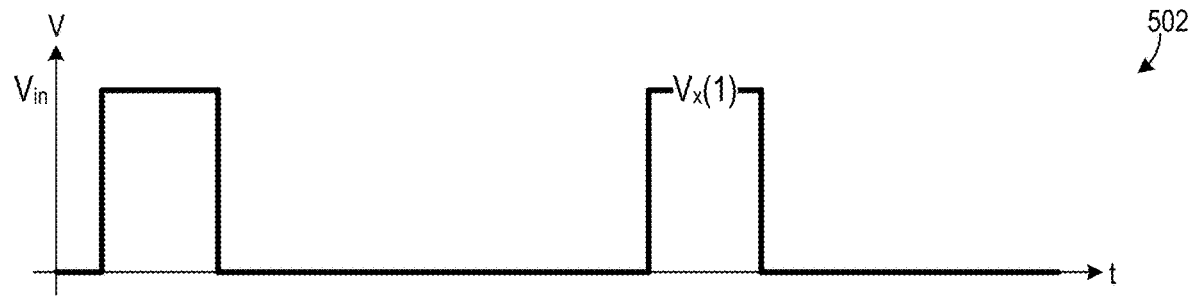
FIGS. 5A-5D are graphs illustrating one example of operation of an embodiment of the FIG. 2 switching power converter including two power stages.
Figure 5B:
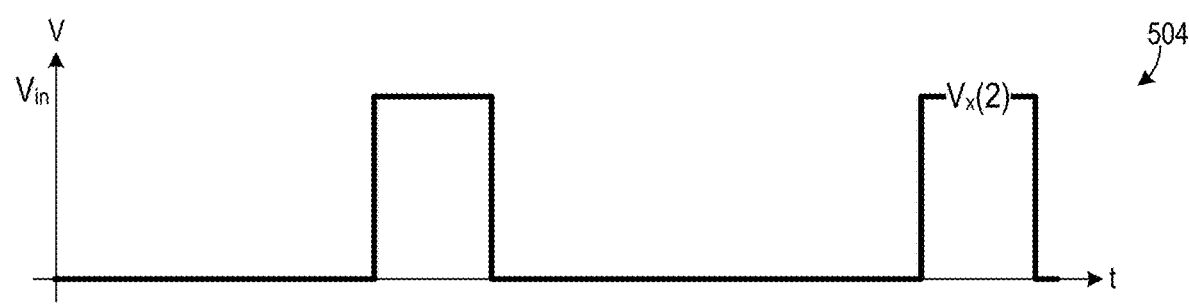
Figure 5C:
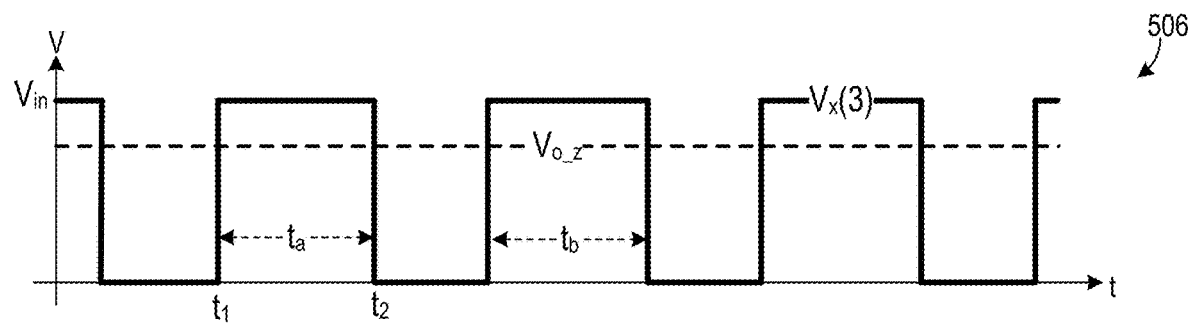
Figure 5D:
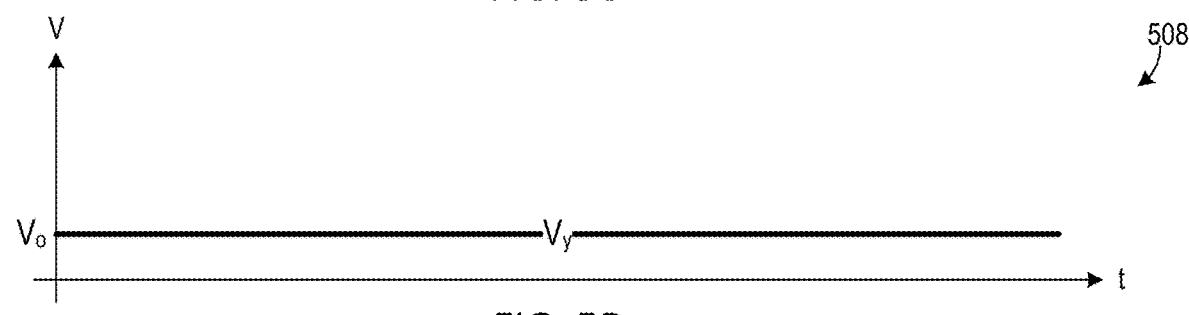

Ripple current associated with leakage inductances $L_k$ results from respective AC voltages $V_L$ across the leakage inductances. Accordingly, controller 206 is configured to generate control signals UI and LI to operate injection stage 204 in a manner that reduces voltages $V_L$ across leakage inductances, to reduce ripple current magnitude. For example, FIGS. 5A-5D are graphs collectively illustrating one example of operating of an embodiment of switching power converter 200 where N is equal to two, such that switching power converter 200 includes two power stages 202 and one injection stage 204. Graphs 5A-5D also assume that the magnetizing inductance value of coupled inductor 228 is much greater than any leakage inductance value of coupled inductor 228. Graph 502 is a graph of switching node voltage $V_x(1)$ versus time, and graph 504 is a graph of switching node voltage $V_x(2)$ versus time. As illustrated in FIGS. 5A and 5B, each switching node X(1) and X(2) is repeatedly driven high and low between $V_{in}$ and zero volts, respectively, and the switching nodes are driven high and low out-of-phase with each other. FIG. 5C is a graph 506 including a curve representing voltage at the injection switching node X(N+1), which is node X(3) because N is equal to two in this example. FIG. 5C also includes a curve representing voltage $V_{o\_z}$ at injection output node 222. FIG. 5D is a graph 508 of intermediate voltages $V_y$ between magnetizing inductances $L_m$ and leakage inductances $L_k$ (see FIG. 4 for intermediate voltages $V_y$). Each intermediate voltage $V_y$ has essentially constant value due to the magnetizing inductance value of coupled inductor 228 being very large relative to the leakage inductance values.

In the example of FIGS. 5A-5D, controller 206 controls injection stage 204 so that injection stage 204 switches in a manner which compensates for power transfer windings 210 being driven low. Specifically, injection winding 220 is driven high in response to any power transfer winding 210 being driven low, and injection winding 220 is driven low in response to any power transfer winding 210 being driven high, as illustrated in FIGS. 5A-5C. For example, injection winding 220 is driven high at time $t_1$ in response to power transfer winding 210(1) being driven low, and injection winding 220 is driven low at time $t_2$ in response to power transfer winding 210(2) being driven high. Consequently, intermediate voltages $V_y$ remain essentially constant at the value of $V_o$, as shown in FIG. 5D. As a result, voltages on both sides of each leakage inductance $L_k$ are essentially identical, i.e., voltage at each side of each leakage inductance $L_k$ is essentially equal to $V_o$. For example, referring to FIG. 4, voltage $V_y(1)$ is essentially equal to $V_o$, and voltage at terminal B(1) is also equal $V_o$. Therefore, voltages $V_L$ across leakage inductances $L_k$ remain essentially at zero even as power transfer windings 210 are repeatedly driven between high and low states to regulate one or more parameters of switching power converter 200. As a result, there is no material ripple current associated with leakage inductances $L_k$, irrespective of operating duty cycle of switching power converter 200.

It should be noted that there will be ripple current associated with charge and discharge of magnetizing inductance $L_m$. However, such ripple current magnitude will be small if magnetizing inductance $L_m$ is large. Additionally, as discussed above, increasing magnetizing inductance $L_m$ does not degrade transient response. In a conventional switching power converter with a coupled inductor, in contrast, ripple current magnitude can be decreased mainly by increasing leakage inductance values and/or switching frequency, both of which have drawbacks. Specifically, increasing leakage inductance values impairs transient response, and increasing switching frequency increases switching power loss. Ripple current magnitude in a conventional coupled inductor can also be decreased by increasing magnetizing inductance $L_m$, but improvement will be limited and soon achieve diminishing returns. Accordingly, switching power converter 200 can achieve low ripple current magnitude without the drawbacks of achieving low ripple current magnitude in a conventional switching power converter.

The example of FIGS. 5A-5D assumes essentially ideal magnetic coupling of the windings of coupled inductor 228, i.e., that the magnetizing inductance value is much greater than any leakage inductance value. Such assumption may not hold true in practical implementations, and voltages $V_L$ will therefore not necessarily be zero in practical implementations. Nevertheless, injection stage 204 may significantly reduce voltages $V_L$, such that injection stage 204 may significantly reduce ripple current magnitude, even if non-ideal coupling of coupled inductor 228 prevents injection stage 204 from completely eliminating ripple current associated with leakage inductances $L_k$. Additionally, FIGS. 5A-5D assume ideal timing, i.e., that injection stage 204 switches in synchronicity with power stages 202. While such synchronicity may be desired, it is not required for acceptable operation of switching power converter 200.

The example of FIGS. 5A-5D assumes that power stages 202 are driven high in a non-overlapping manner, or in other words, that no more than one power stage 202 is driven high at any given time. However, switching power converter 200 is not limited to non-overlapping operation. For example, FIGS. 6A-6F are graphs collectively illustrating one example of operation of an embodiment of switching power converter 200 where N is equal to four, such that switching power converter 200 includes four power stages 202 and one injection stage 204. Graphs 6A-6F also assume that the magnetizing inductance value of coupled inductor 228 is much greater than any leakage inductance value of coupled inductor 228. Graph 602 is a graph of switching node voltage $V_x(1)$ versus time, graph 604 is a graph of switching node voltage $V_x(2)$ versus time, graph 606 is a graph of switching node voltage $V_x(3)$ versus time, and graph 608 is a graph of switching node voltage $V_x(4)$ versus time. As illustrated in FIGS. 6A-6D, each switching node X(1), X(2), X(3), and X(4) is repeatedly driven high and low between $V_{in}$ and zero volts, and the switching nodes are driven high and low out-of-phase with each other. FIG. 6E is a graph 610 including a curve representing voltage at the injection switching node X(N+1), which is node X(5) because N is equal to four in this example. FIG. 6E also includes a curve representing voltage $V_{o\_z}$ at injection output node 222. FIG. 6F is a graph 612 of intermediate voltages $V_y$ between magnetizing inductances $L_m$ and leakage inductances $L_k$. Each intermediate voltage $V_y$ has essentially a constant value due to the magnetizing inductance value of coupled inductor 228 being very large relative to the leakage inductance values.

Figure 6A:
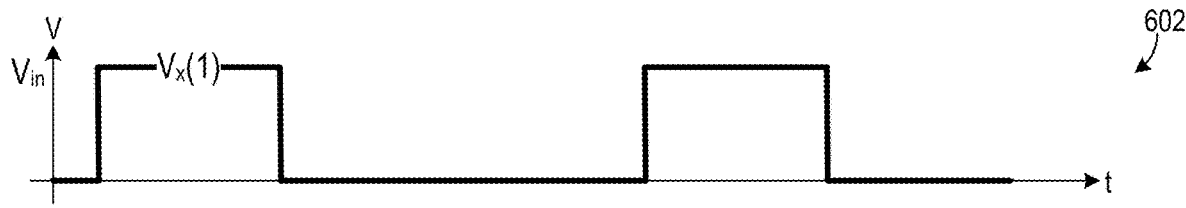
FIGS. 6A-6F are graphs illustrating one example of operation of an embodiment of the FIG. 2 switching power converter including four power stages.
Figure 6B:
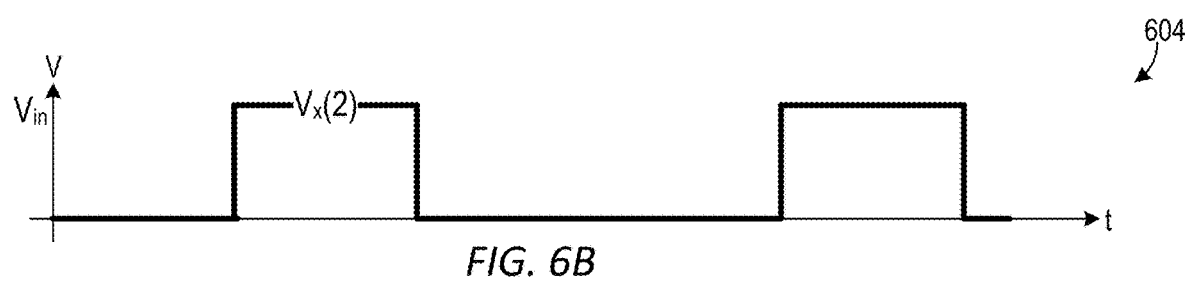
Figure 6C:
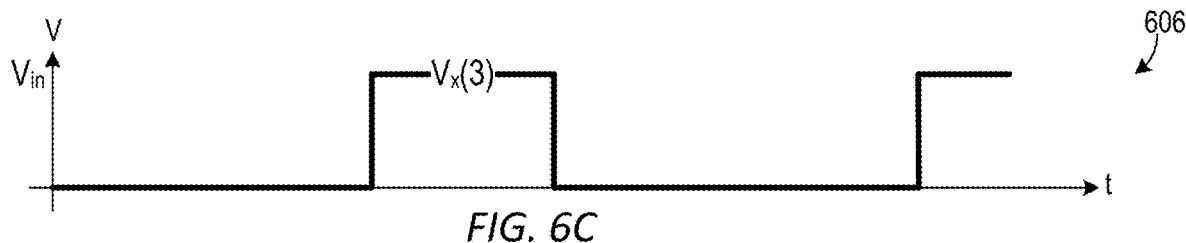
Figure 6D:
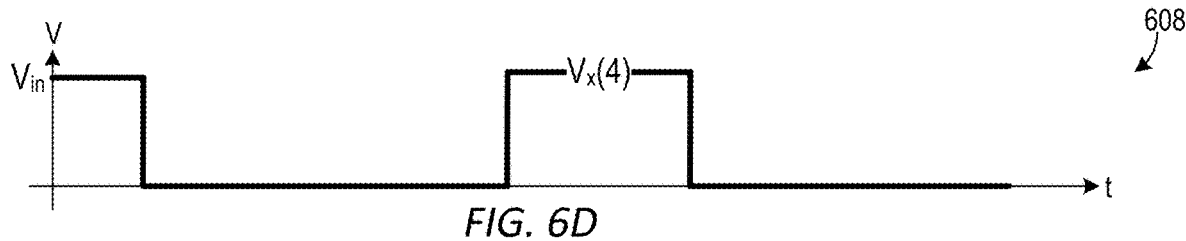
Figure 6E:
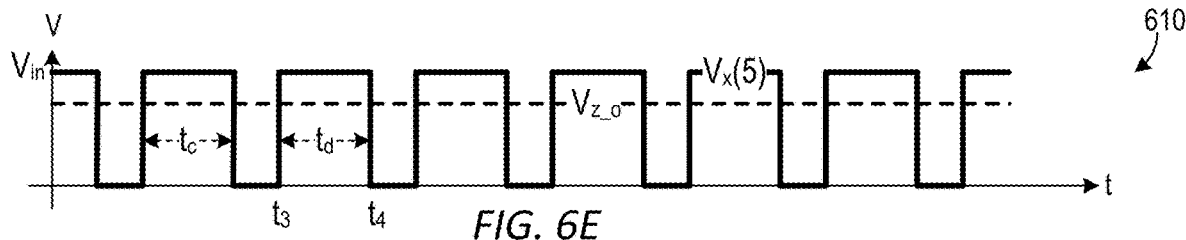
Figure 6F:
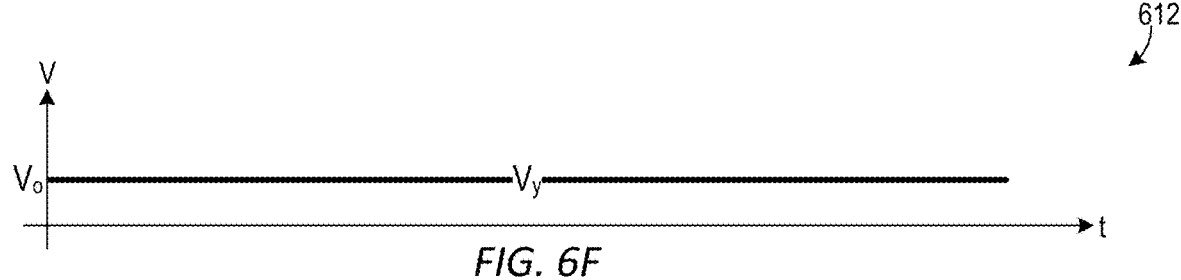

As evident from FIGS. 6A and 6D, the switching node X(1)-X(4) voltages overlap in that two switching nodes may be driven high at the same time. Accordingly, controller 206 controls injection stage 204 so that injection stage 204 switches in a manner which compensates for one power transfer winding 210 being driven low while another power transfer winding 210 is driven high, thereby preventing change in intermediate node voltages $V_y$. For example, injection winding 220 is driven high at time $t_3$ in response to power transfer winding 210(1) being driven low while power transfer winding 210(2) is driven high, and injection winding 220 is driven low at time $t_4$ in response to power transfer winding 210(3) being driven high. Accordingly, injection winding 220 is driven high whenever only one power transfer winding 210 is driven high, and injection winding 220 is driven low whenever two power transfer windings 210 are driven high. Consequently, intermediate voltages $V_y$ remain essentially constant at the value of $V_o$, as shown in FIG. 6F. Therefore, voltages $V_L$ across leakage inductances $L_k$ remain essentially at zero even as power transfer windings 210 are repeatedly driven been high and low states to regulate one or more parameters of switching power converter 200. As a result, there is no material ripple current associated with leakage inductances $L_k$, irrespective of operating duty cycle of switching power converter 200.

Similar to the example of FIGS. 5A-5D, the example of FIGS. 6A-6F assumes essentially ideal magnetic coupling of the windings of coupled inductor 228. However, injection stage 204 may significantly reduce ripple current magnitude even if non-ideal coupling of coupled inductor 228 prevents injection stage 204 from completely eliminating ripple current associated with leakage inductances $L_k$. Additionally, while FIGS. 6A-6F assume ideal timing, i.e., that injection stage 204 switches in synchronicity with power stages 202, timing may vary while still achieving acceptable operation of switching power converter 200.

Figure 7:
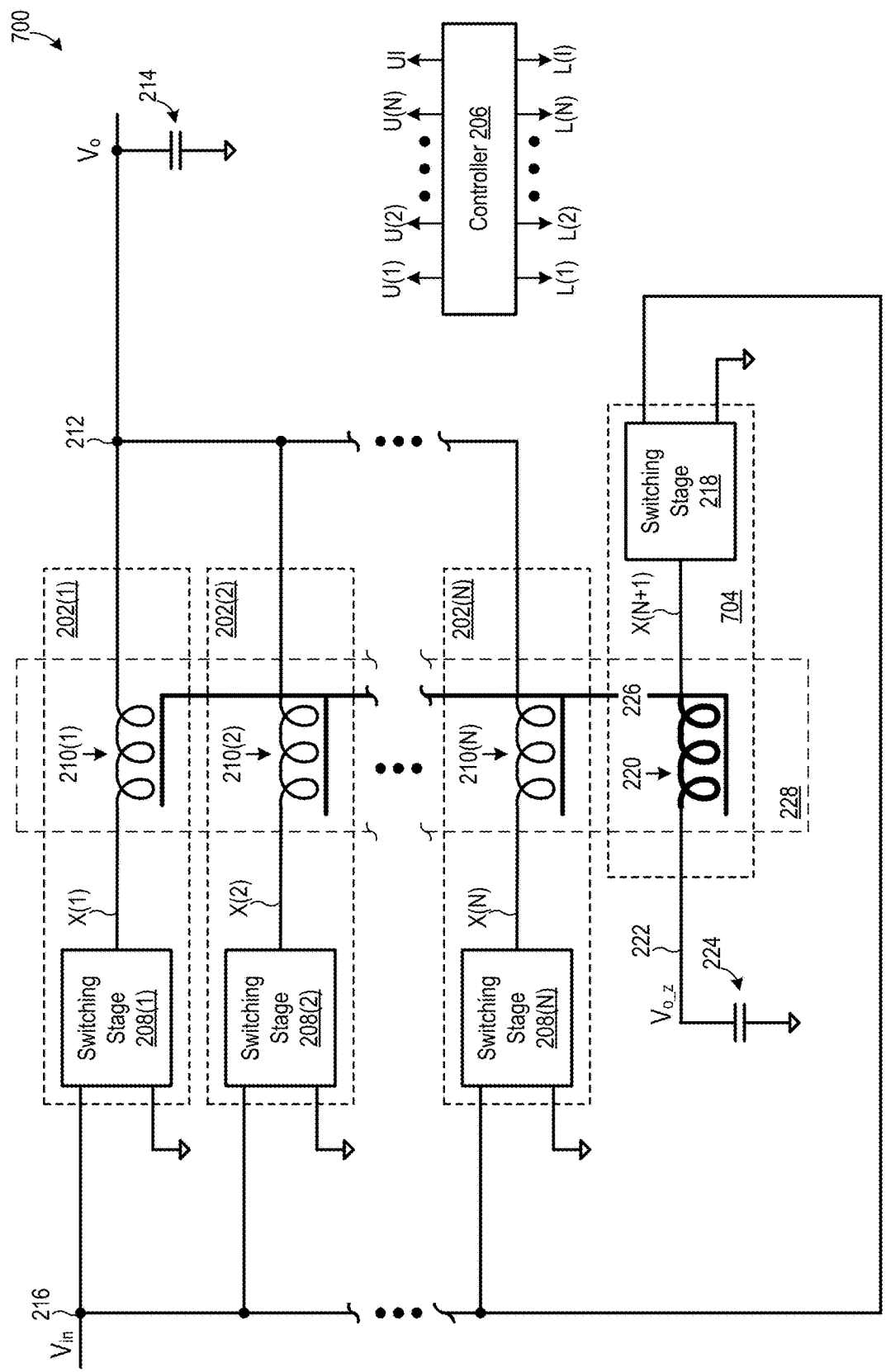
FIG. 7 is a schematic diagram of an alternate embodiment of the FIG. 2 switching power converter which includes an injection stage configured to compensate for a power transfer winding being driven high.

Referring again to FIG. 2, injection stage 204 is configured to compensate for a power transfer winding 210 being driven low, i.e., to inject magnetic flux into magnetic core 226 in a manner which prevents intermediate voltages $V_y$ from changing when a power transfer winding 210 is driven low. However, injection stage 204 could be modified to instead compensate for a power transfer winding 210 being driven high, i.e., to inject magnetic flux into magnetic core 226 in a manner which prevents intermediate voltages $V_y$ from changing when a power transfer winding 210 is driven high. For example, FIG. 7 is a schematic diagram of a switching power converter 700, which is an alternate embodiment of switching power converter 200 with injection stage 204 replaced with an injection stage 704. Injection stage 704 includes the same constituent elements as injection stage 204, but injection stage 704 is configured to compensate for a power transfer winding 210 being driven high, to prevent intermediate voltages $V_y$ from changing when a power transfer winding 210 is driven high.

Figure 8A:
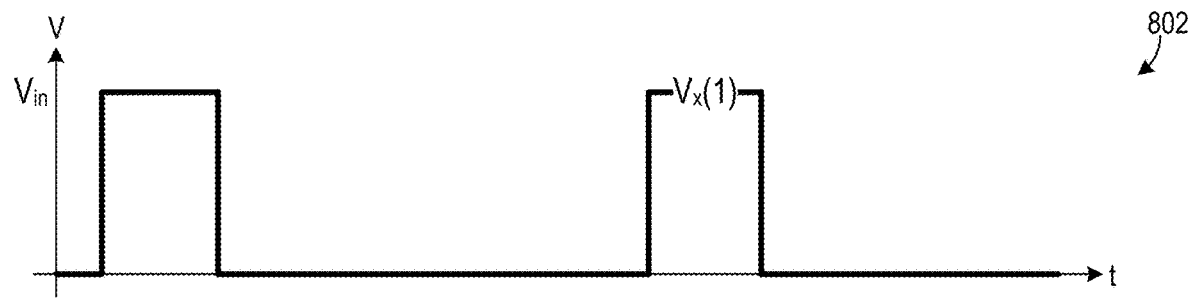
FIGS. 8A-8D are graphs illustrating one example of operation of an embodiment of the FIG. 7 switching power converter including two power stages.
Figure 8B:
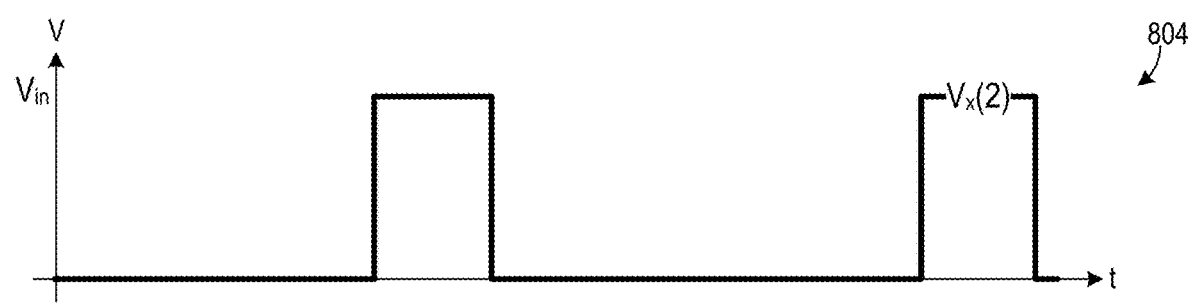
Figure 8C:
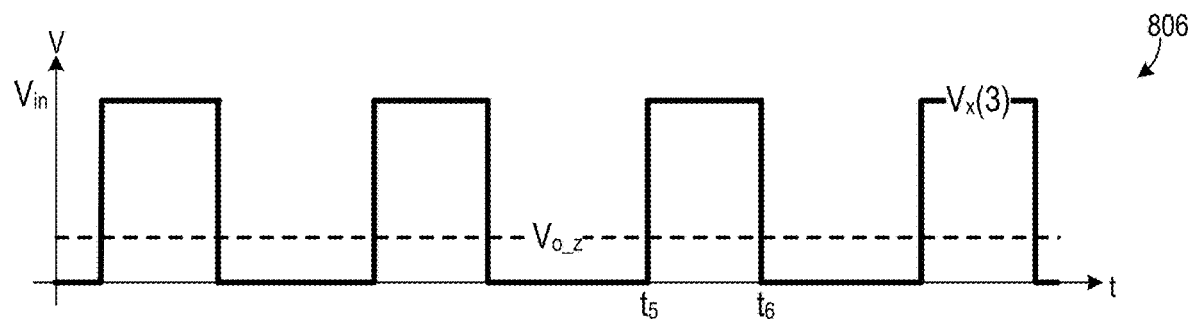
Figure 8D:
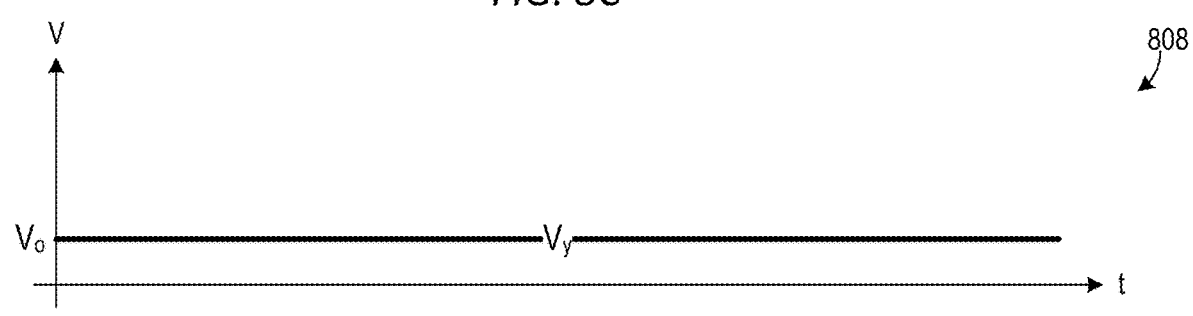

FIGS. 8A-8D are graphs collectively illustrating one example of operation of an embodiment of switching power converter 700 where N is equal to two, such that switching power converter 700 includes two power stages 202 and one injection stage 204. Graphs 8A-8D also assume that the magnetizing inductance value of coupled inductor 228 is much greater than any leakage inductance value of coupled inductor 228. Graph 802 is a graph of switching node voltage $V_x(1)$ versus time, and graph 804 is a graph of switching node voltage $V_x(2)$ versus time. FIG. 8C is a graph 806 including a curve representing voltage at the injection switching node X(N+1), which is node X(3) because N is equal to two in this example. FIG. 8C also includes a curve representing voltage $V_{o\_z}$ at injection output node 222. FIG. 8D is a graph 808 of intermediate voltages $V_y$ between magnetizing inductances $L_m$ and leakage inductances $L_k$. Each intermediate voltage $V_y$ has essentially the same value due to the magnetizing inductance value of coupled inductor 228 being very large relative to the leakage inductance values.

In the example of FIGS. 8A-8D, controller 206 controls injection stage 704 so that injection stage 704 switches in a manner which compensates for power transfer windings 210 being driven high. Specifically, injection winding 220 is driven high in response to any power transfer winding 210 being driven high, and injection winding 220 is driven low in response to any power transfer winding 210 being driven low, as illustrated in FIGS. 8A-8C. For example, injection winding 220 is driven high at time $t_5$ in response to power transfer winding 210(1) being driven high, and injection winding 220 is driven low at time $t_6$ in response to power transfer winding 210(1) being driven low. Consequently, intermediate voltages $V_y$ remain essentially constant at the value of $V_o$, as shown in FIG. 8D. Therefore, voltages $V_L$ across leakage inductances $L_k$ remain essentially at zero even as power transfer windings 210 are repeatedly driven between high and low states to regulate one or more parameters of switching power converter 700. As a result, there is no material ripple current associated with leakage inductance $L_k$, irrespective of operating duty cycle of switching power converter 700.

Similar to the example of FIGS. 5A-5D, the example of FIGS. 8A-8D assumes essentially ideal magnetic coupling of the windings of coupled inductor 228. However, injection stage 704 may significantly reduce ripple current magnitude even if non-ideal coupling of coupled inductor 228 prevents injection stage 704 from completely eliminating ripple current associated with leakage inductances $L_k$. Additionally, while FIGS. 8A-8D assume ideal timing, i.e., that injection stage 704 switches in synchronicity with power stages 202, timing may vary while still achieving acceptable operation of switching power converter 700.

Referring again to FIG. 2, injection stage 204 is powered from input power node 216, which enables injection stage 204 to properly operate with coupled inductor 228 being symmetrical. Coupled inductor 228 is symmetrical in that (a) injection winding 220 forms the same number of turns as each power transfer winding 210 and (b) reluctance of a magnetic flux path between injection winding 220 and any power transfer winding 210 is substantially the same as reluctance of a magnetic flux path between any two power transfer windings 210. Switching power converter 200 could be modified so that injection stage 204 is powered from a node having a voltage different from $V_{in}$ with appropriate changes to coupled inductor 228 so that the coupled inductor is no longer symmetrical.

Figure 9:
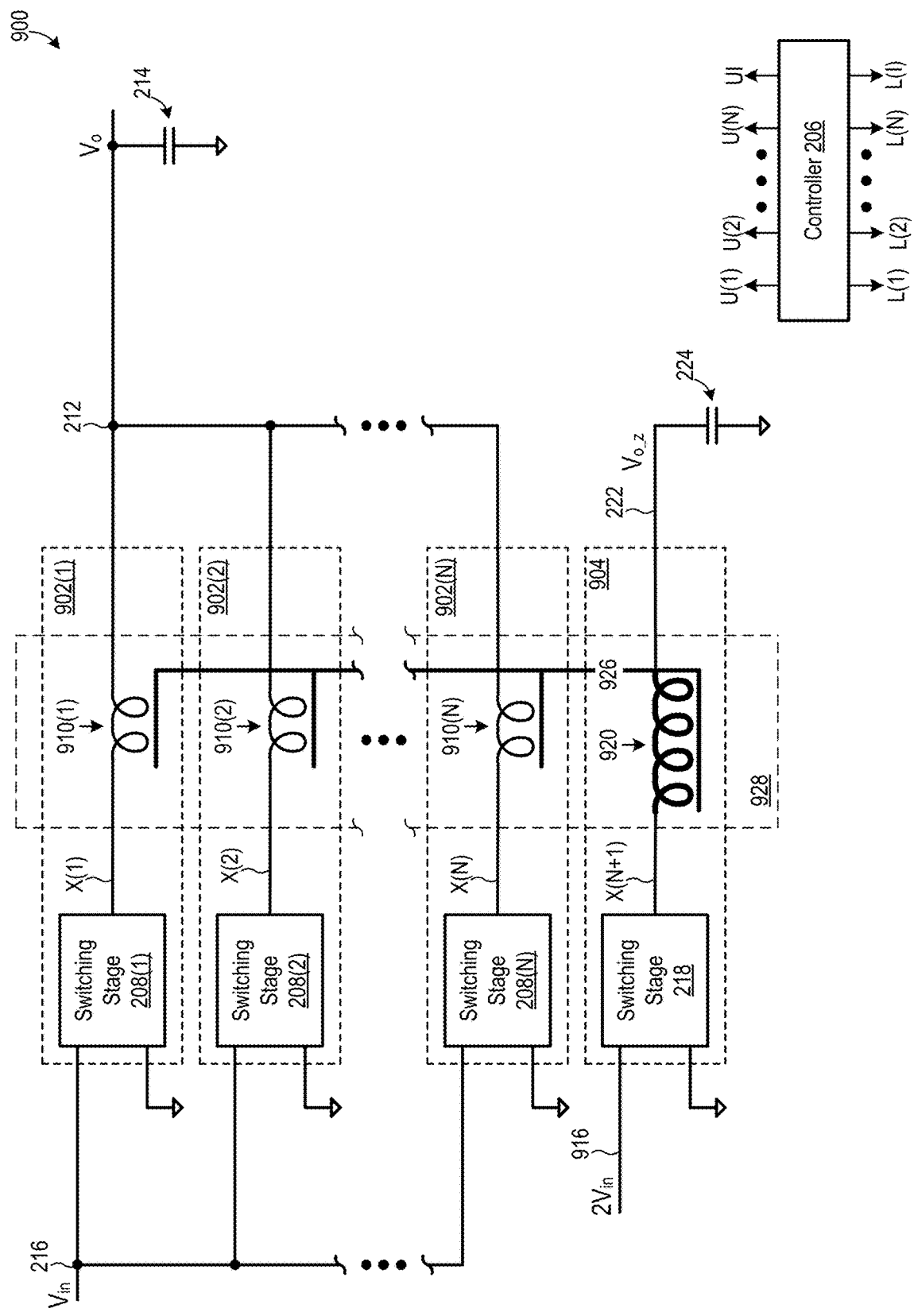
FIG. 9 is a schematic diagram of an alternate embodiment of the FIG. 2 switching power converter including an asymmetric coupled inductor.

For example, FIG. 9 is a schematic diagram of a switching power converter 900, which is an alternate embodiment of switching power converter 200 where injection stage 204 is replaced with an injection stage 904 powered from an input power rail 916. Input power rail 916 is at twice the voltage of input power rail 216, i.e., input power rail 916 is at voltage $2V_{in}$. Therefore, symmetrical coupled inductor 228 is replaced with an asymmetrical coupled inductor 928 to compensate for the change in input voltage to injection stage 904. Coupled inductor 928 includes N power transfer windings 910 and one injection winding 920, where power transfer windings 910 are alternate embodiments of power transfer windings 210 and injection winding 920 is an alternate embodiment of injection winding 220. Coupled inductor 928 is asymmetrical in that injection winding 920 forms twice the number of turns as each power transfer winding 910, to compensate for the input voltage to injection stage 904 being twice the input voltage to each power transfer stage 902. Each power stage 902 is the same as a corresponding power stage 202 of FIG. 2, except that each power stage 902 includes a power transfer winding 910 of asymmetrical coupled inductor 928 instead of a power transfer winding 210 of symmetrical coupled inductor 228.

Figure 10A:
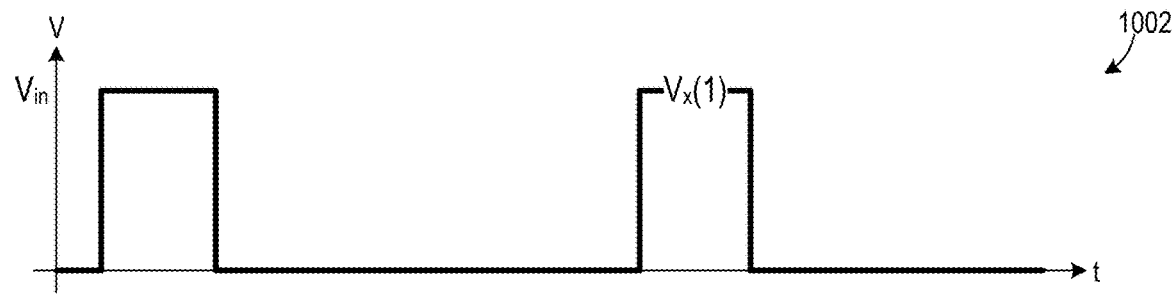
FIGS. 10A-10D are graphs illustrating one example of operation of an embodiment of the FIG. 9 switching power converter including two power stages.
Figure 10B:
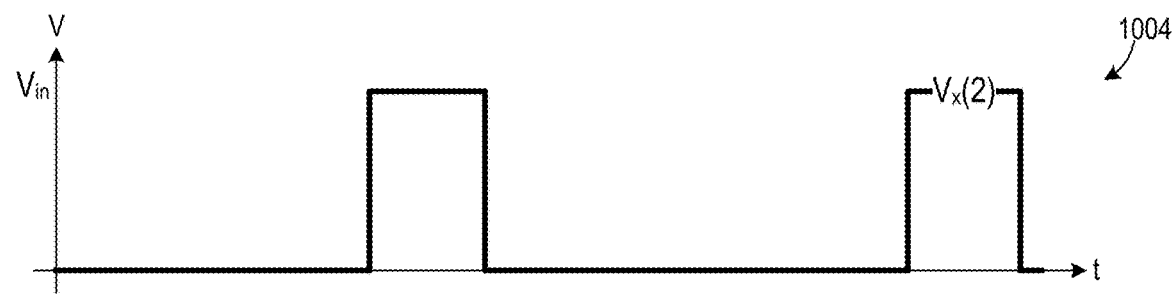
Figure 10C:
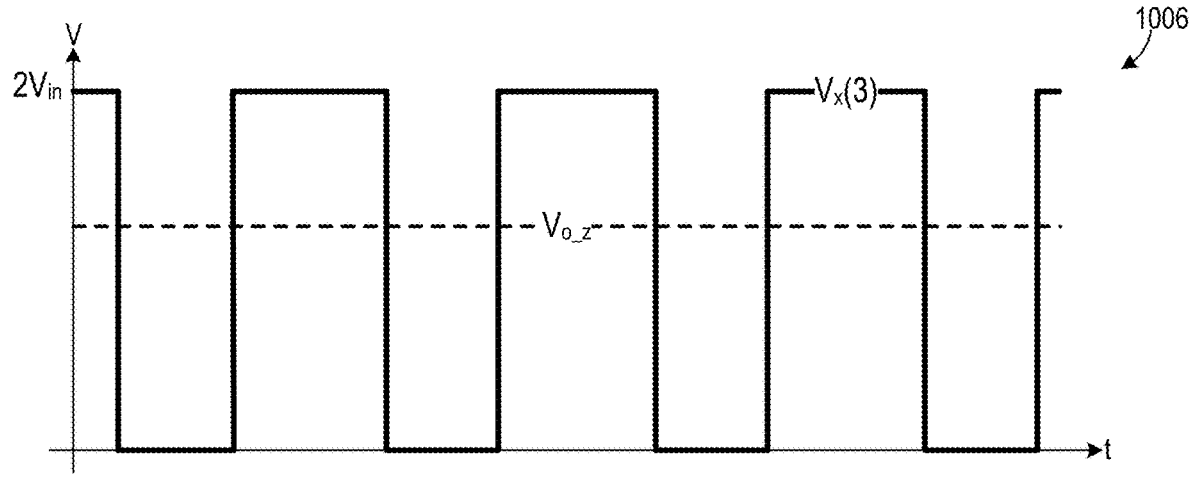
Figure 10D:
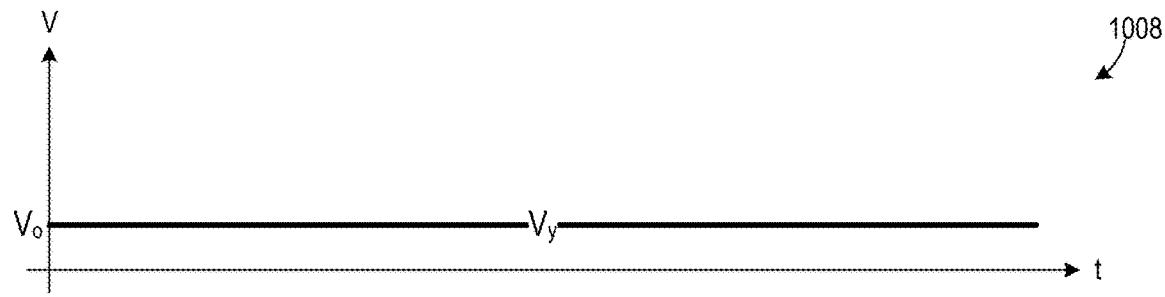

FIGS. 10A-10D are graphs collectively illustrating one example of operation of an embodiment of switching power converter 900 where N is equal to two, such that switching power converter 900 includes two power stages 902 and one injection stage 904. Graphs 10A-10D also assume that the magnetizing inductance value of coupled inductor 928 is much greater than any leakage inductance value of coupled inductor 928. Graph 1002 is a graph of switching node voltage $V_x(1)$ versus time, and graph 1004 is a graph of switching node voltage $V_x(2)$ versus time. FIG. 10C is a graph 1006 including a curve representing voltage at the injection switching node X(N+1), which is node X(3) because N is equal to two in this example. FIG. 10C also includes a curve representing voltage $V_{o\_z}$ at injection output node 222. FIG. 10D is a graph 1008 of intermediate voltages $V_y$ between magnetizing inductances $L_m$ and leakage inductances $L_k$, where coupled inductor 928 has an electrical model analogous to the FIG. 4 electrical model of coupled inductor 228. Each intermediate voltage $V_y$ has essentially the same value due to the magnetizing inductance value of coupled inductor 928 being very large relative to the leakage inductance values.

In the example of FIGS. 10A-10D, controller 206 controls injection stage 904 so that injection stage 904 switches in a manner which compensates for power transfer windings 910 being driven low. Specifically, injection winding 920 is driven high in response to any power transfer winding 910 being driven low, and injection winding 920 is driven low in response to any power transfer winding 910 being driven high, as illustrated in FIGS. 10A-10C. Although injection switching node $V_x(3)$ is driven to twice voltage $V_{in}$ instead of to voltage $V_{in}$, the asymmetrical winding turn numbers of coupled inductor 928 compensate for this difference in input voltage. Consequently, intermediate voltages $V_y$ remain essentially constant at the value of $V_o$, as shown in FIG. 10D. Therefore, voltages $V_L$ across leakage inductances $L_k$ remain essentially at zero even as power transfer windings 910 are repeatedly driven between high and low states to regulate one or more parameters of switching power converter 900. As a result, there is no material ripple current associated with leakage inductance $L_k$, irrespective of operating duty cycle of switching power converter 900.

Similar to the example of FIGS. 5A-5D, the example of FIGS. 10A-10D assumes essentially ideal magnetic coupling of the windings of coupled inductor 928. However, injection stage 904 may significantly reduce ripple current magnitude even if non-ideal coupling of coupled inductor 928 prevents injection stage 904 from completely eliminating ripple current associated with leakage inductances $L_k$. Additionally, while FIGS. 10A-10D assume ideal timing, i.e., that injection stage 904 switches in synchronicity with power stages 902, timing may vary while still achieving acceptable operation of switching power converter 900.

Referring again to FIG. 9, coupled inductor 928 could be modified so that it is asymmetrical in magnetic flux path reluctance, instead of in number of winding turns. For example, coupled inductor 928 could be replaced with an asymmetrical coupled inductor where all windings form the same number of turns, but where a magnetic flux path between the injection winding and any one power transfer winding has twice the reluctance of a magnetic flux path between any two power transfer windings.

Figure 11:
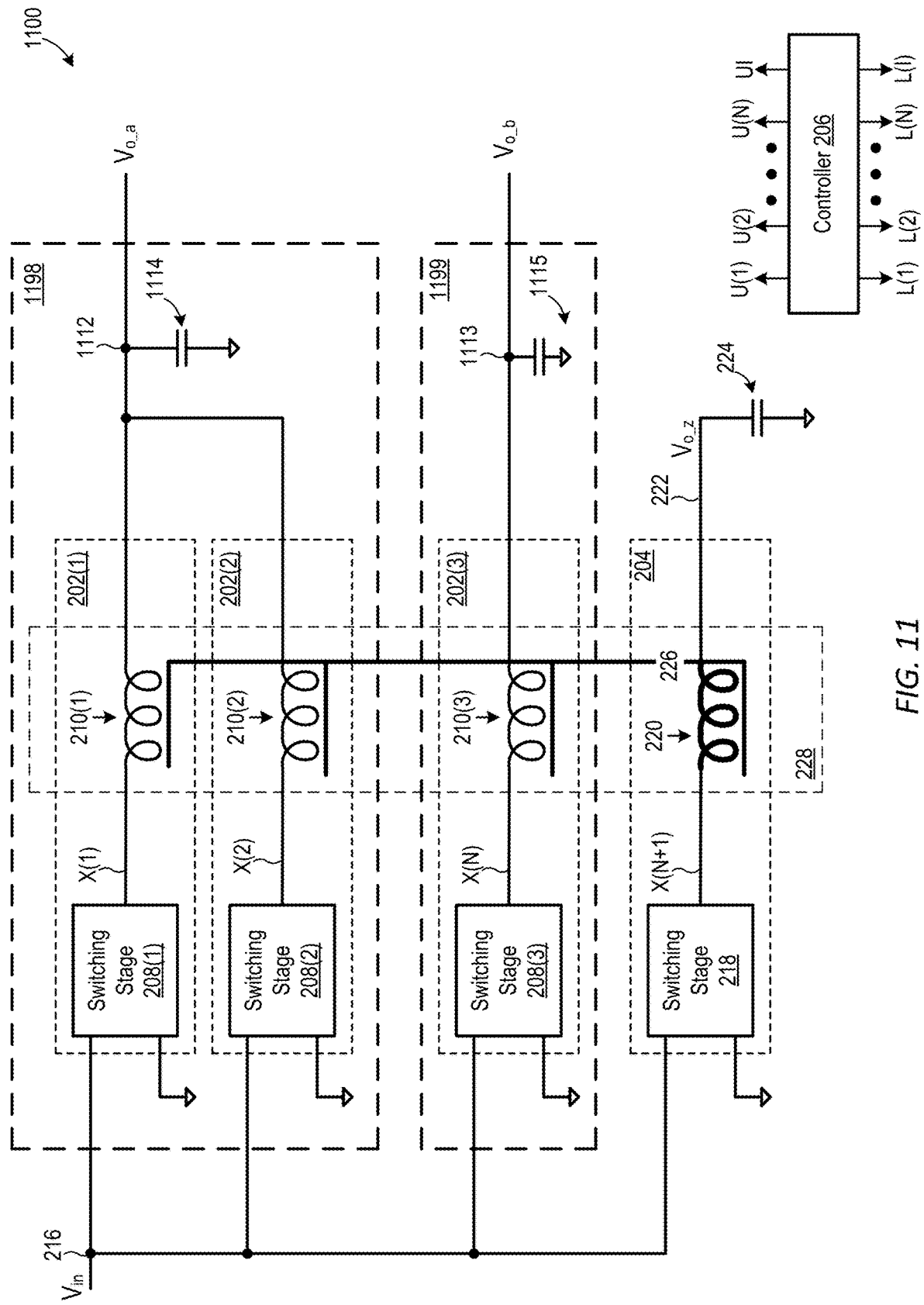
FIG. 11 is a schematic diagram of an alternate embodiment of the FIG. 2 switching power converter including two power sub-converters.

Any of the switching power converters disclosed herein could be modified so that at least two of the power stages are part of different respective power sub-converters. For example, FIG. 11 is a schematic diagram of a switching power converter 1100, which is an alternate embodiment of switching power converter 200 where N is equal to three and the switching power converter includes two power sub-converters 1198 and 1199. Power stages 202(1) and 202(2) are part of power sub-converter 1198, and each of these power stages is electrically coupled between input power node 216 and an output power node 1112 of power sub-converter 1198. Output power node 1112 is at a voltage $V_{o\_a}$, and one or more capacitors 1114 are optionally electrically coupled to output power node 1112. Power stage 202(3) is part of power sub-converter 1199, and the power stage is electrically coupled between input power node 216 and an output power node 1113 of power sub-converter 1199. Output power node 1113 is at a voltage $V_{o\_b}$, and one or more capacitors 1115 are optionally electrically coupled to output power node 1113.

Figure 12A:
FIGS. 12A-12D are graphs illustrating one example of operation of an embodiment of the FIG. 11 switching power converter.
Figure 12B:
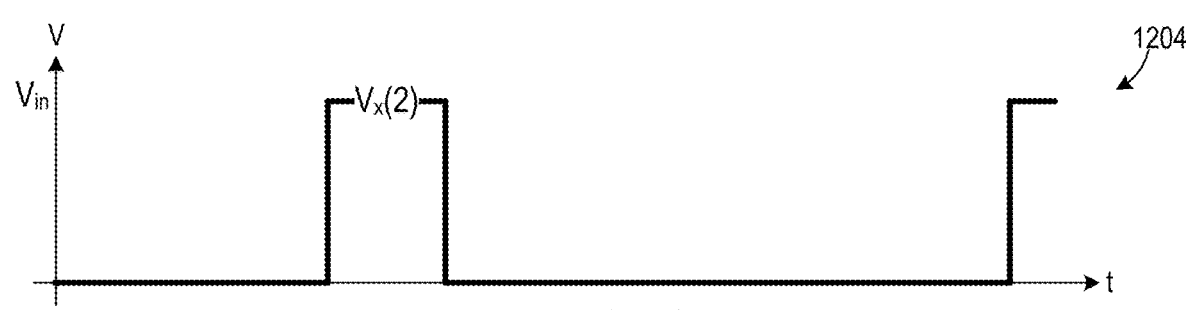
Figure 12C:
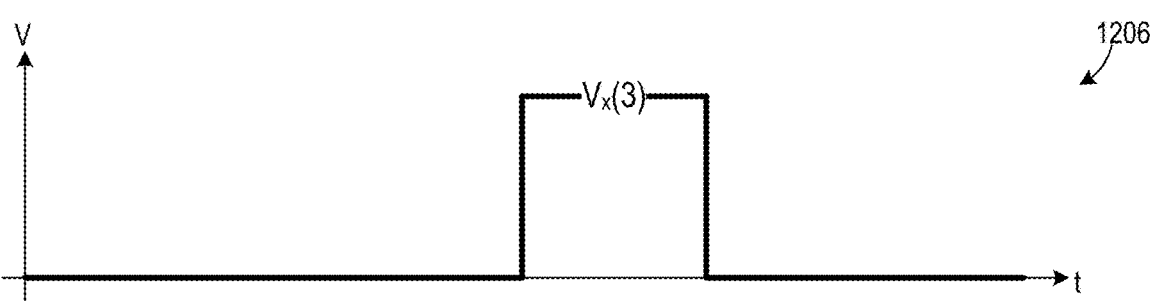
Figure 12D:
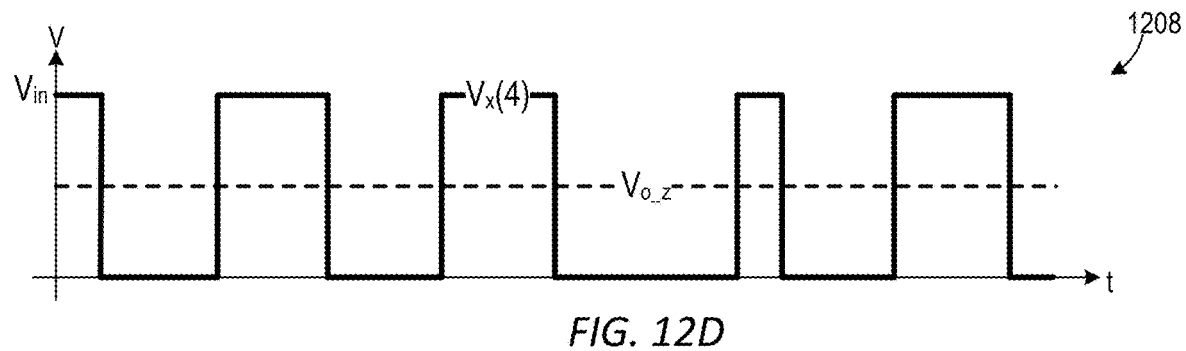

FIGS. 12A-12D are graphs collectively illustrating one example of operation of an embodiment of switching power converter 1100. Graphs 12A-12D assume that the magnetizing inductance value of coupled inductor 228 is much greater than any leakage inductance value of coupled inductor 228. Graph 1202 is a graph of switching node voltage $V_x(1)$ versus time, graph 1204 is a graph of switching node voltage $V_x(2)$ versus time, and graph 1206 is a graph of switching node voltage $V_x(3)$ versus time. FIG. 12D is a graph 1208 including a curve representing voltage at the injection switching node X(N+1), which is node X(4) because N is equal to three in this example. FIG. 12D also includes a curve representing voltage $V_{o\_z}$ at injection output node 222. In this example, controller 206 controls injection stage 204 so that injection stage 204 switches in a manner which compensates for power transfer windings 210 being driven low. Specifically, injection winding 220 is driven high in response to any power transfer winding 210 being driven low, and injection winding 220 is driven low in response to any power transfer winding 210 being driven high, as illustrated in FIGS. 12A-12C. Consequently, voltages $V_L$ across leakage inductances $L_k$ remain essentially at zero even as power transfer windings 210 are repeatedly driven between high and low states to regulate one or more parameters of switching power converter 1100. As a result, there is no material ripple current associated with leakage inductance $L_k$, irrespective of operating duty cycle of switching power converter 200.

Similar to the example of FIGS. 5A-5D, the example of FIGS. 12A-12D assumes essentially ideal magnetic coupling of the windings of coupled inductor 228. However, injection stage 204 may significantly reduce ripple current magnitude even if non-ideal coupling of coupled inductor 228 prevents injection stage 204 from completely eliminating ripple current associated with leakage inductances $L_k$. Additionally, while FIGS. 12A-12D assume ideal timing, i.e., that injection stage 204 switches in synchronicity with power stages 202, timing may vary while still achieving acceptable operation of switching power converter 1100.

Switching power converter 1100 could be modified so that injection stage 204 compensates for a power transfer winding 210 being driven high, instead of compensating for a power transfer winding 210 being driven low, such as in a manner analogous to that discussed above with respect to FIGS. 7 and 8. Furthermore, switching power converter 1100 could be modified to include a different number of power stages 202, a different number of power sub-converters, and/or a different distribution of power stages 202 among power sub-converters. Additionally, two or more power sub-converters could be daisy chained, i.e., an output of one power sub-converter could be an input of another power sub-converter. The power sub-converters could also be of a different type, for example a buck power sub-converter could be coupled with a boost power sub-converter, etc.

Figure 13:
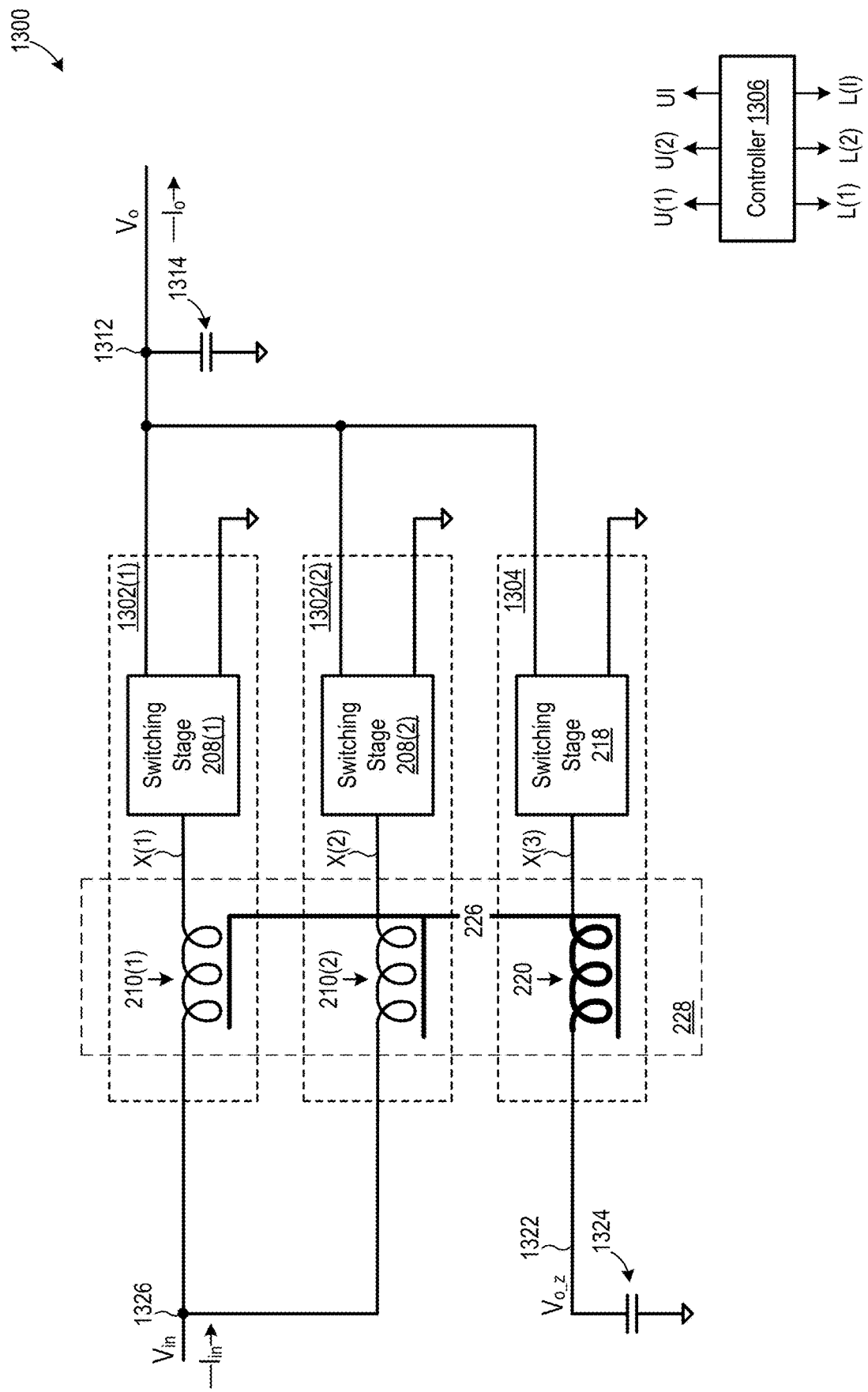
FIG. 13 is a schematic diagram of an alternate embodiment of the FIG. 2 switching power converter having a multi-phase boost-type topology.

The example switching power converters discussed above have a multi-phase buck-type topology. However, the new switching power converters including injection stages are not limited to a buck-type topology. For example, FIG. 13 is a schematic diagram of a switching power converter 1300, which is an alternate embodiment of switching power converter 200 having a multi-phase boost-type topology, where N is equal to two. Power stages 202 of converter 200 are replaced with power stages 1302 in converter 1300. Power stages 1302 include the same constituent elements as power stages 202, but with the elements configured in a different topology. Specifically, each power transfer winding 210 is electrically coupled between an input power node 1326 and a switching node X of the respective power stage 1302. The upper and lower switching devices of each power switching stage 208, e.g., switching devices 306 and 308 of FIG. 3, are electrically coupled in series between an output power node 1312 and ground. Accordingly, each power switching stage 208 is configured to repeatedly switch its respective switching node X between a voltage $V_o$ of output power node 1312 and ground. A given power transfer winding 210 in converter 1300 is driven high when its respective switching node X is at voltage $V_o$, and the power transfer winding 210 is driven low when its respective switching node X is at zero volts relative to ground. For example, power transfer winding 210(1) is driven high when switching node X(1) is at voltage $V_o$, and power transfer winding 210(1) is driven low when switching node X(1) is at zero volts relative to ground. One or more capacitors 1314 are optionally electrically coupled to output power node 1312.

Injection stage 204 of converter 200 is replaced with an injection stage 1304 in converter 1300. Injection stage 1304 includes the same constituent elements as injection stage 204 but with a different topology. Injection winding 220 is electrically coupled between injection switching node X(3) and an injection output node 1322, and a capacitor 1324 is electrically coupled to injection output node 1322. The upper and lower switching devices of injection switching stage 218, e.g., switching devices 310 and 312 of FIG. 3, are electrically coupled in series between output power node 1312 and ground. Accordingly, injection switching stage 218 is configured to repeatedly switch switching node X(3) between voltage $V_o$ and ground. Injection winding 220 in converter 1300 is driven high when switching node X(3) is at voltage $V_o$, and the injection winding is driven low when switching node X(3) is at zero volts relative to ground.

Controller 1306, which is an embodiment of controller 206, is configured to generate control signals U and L to control duty cycle of power stages 1302 to regulate at least one parameter of switching power converter 1300. Examples of possible regulated parameters include, but are not limited, magnitude of input voltage $V_{in}$, magnitude of input current $I_{in}$, magnitude of output voltage $V_o$, and magnitude of output current J. Controller 1306 is optionally configured to generate control signals U and L such that power stages 1302 switch out-of-phase with each other. Controller 1306 is further configured to generate control signals UI and LI to control injection stage 1304 such that the injection stage injects magnetic flux in magnetic core 226 in a manner which reduces voltage across a respective leakage inductance of each power transfer winding 210, such as by compensating for a power transfer winding 210 be driven high or by compensating for a power transfer winding 210 being driven low.

Figure 14A:
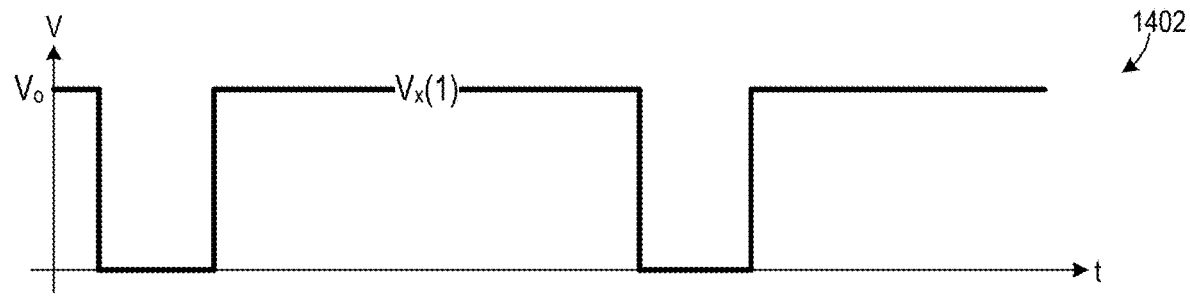
FIGS. 14A-14D are graphs illustrating one example of operation of an embodiment of the FIG. 13 switching power converter.
Figure 14B:
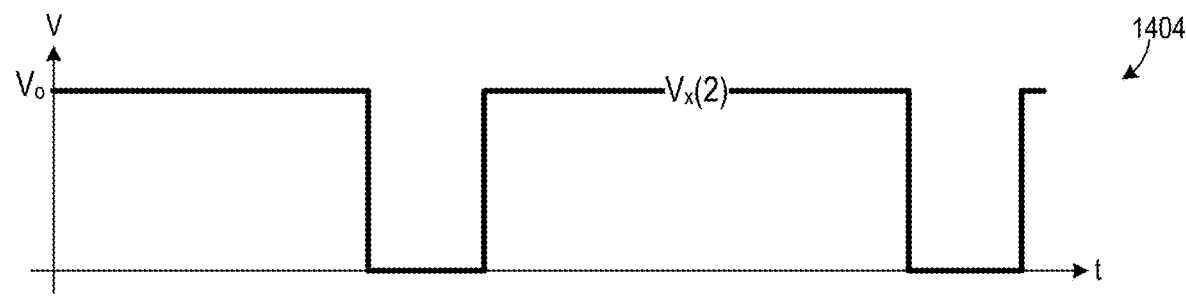
Figure 14C:
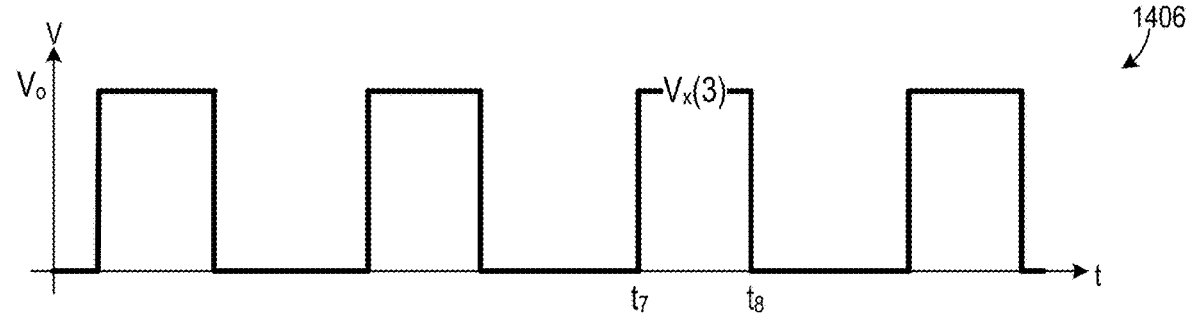
Figure 14D:
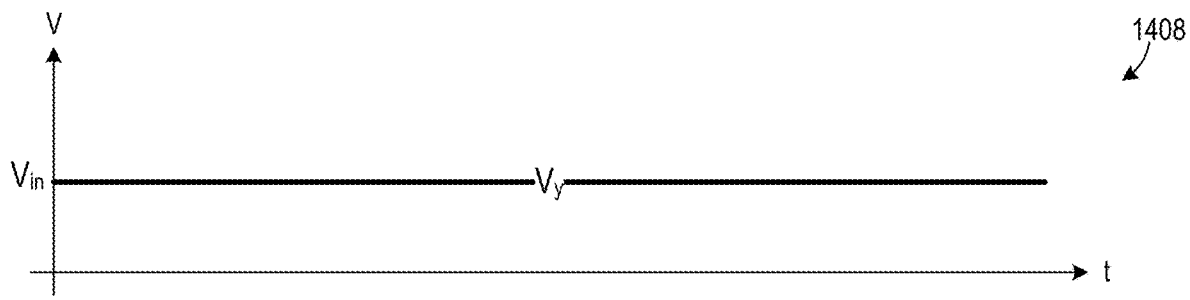

For example, FIGS. 14A-14D are graphs collectively illustrating one example of operation of an embodiment of switching power converter 1300. Graphs 14A-14D assume that the magnetizing inductance value of coupled inductor 228 is much greater than any leakage inductance value of coupled inductor 228. Graph 1402 is a graph of switching node voltage $V_x(1)$ versus time, and graph 1404 is a graph of switching node voltage $V_x(2)$ versus time. FIG. 14C is a graph 1406 including a curve representing voltage at the injection switching node X(3). FIG. 14D is a graph 1408 of intermediate voltages $V_y$ between magnetizing inductances $L_m$ and leakage inductances $L_k$. Each intermediate voltage $V_y$ has essentially the same value due to the magnetizing inductance value of coupled inductor 228 being very large relative to the leakage inductance values.

In the example of FIGS. 14A-14D, controller 1306 controls injection stage 1304 so that injection stage 1304 switches in a manner which compensates for power transfer windings 210 being driven low. Specifically, injection winding 220 is driven high in response to any power transfer winding 210 being driven low, and injection winding 220 is driven low in response to any power transfer winding 210 being driven high, as illustrated in FIGS. 14A-14C. For example, injection winding 220 is driven high at time $t_7$ in response to power transfer winding 210(1) being driven low, and injection winding 220 is driven low at time $t_8$ in response to power transfer winding 210(1) being driven high. Consequently, intermediate voltages $V_y$ remain essentially constant at the value of $V_o$, as shown in FIG. 14D. Therefore, voltages $V_L$ across leakage inductances $L_k$ remain essentially at zero even as power transfer windings 210 are repeatedly driven between high and low states to regulate one or more parameters of switching power converter 1300. As a result, there is no material ripple current associated with leakage inductance $L_k$, irrespective of operating duty cycle of switching power converter 1400.

Similar to the example of FIGS. 5A-5D, the example of FIGS. 14A-14D assumes essentially ideal magnetic coupling of the windings of coupled inductor 228. However, injection stage 1304 may significantly reduce ripple current magnitude even if non-ideal coupling of coupled inductor 228 prevents injection stage 1304 from completely eliminating ripple current associated with leakage inductances $L_k$. Additionally, while FIGS. 14A-14D assume ideal timing, i.e., that injection stage 1304 switches in synchronicity with power stages 1302, timing may vary while still achieving acceptable operation of switching power converter 1300.

Figure 15:
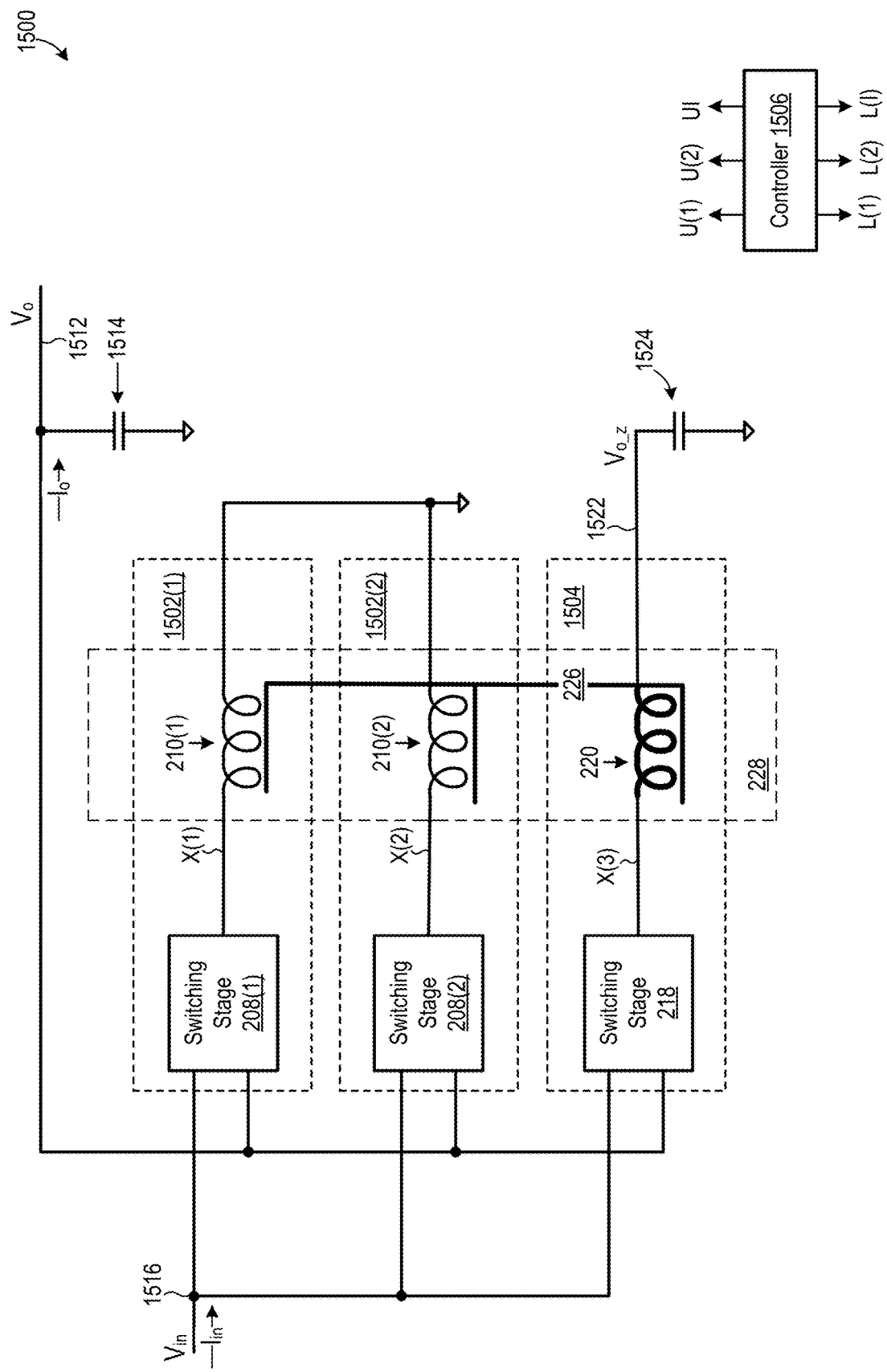
FIG. 15 is a schematic diagram of an alternate embodiment of the FIG. 2 switching power converter having a multi-phase buck-boost-type topology.

FIG. 15 is a schematic diagram of a switching power converter 1500, which is an alternate embodiment of switching power converter 200 having a multi-phase buck-boost-type topology, where N is equal to two. Power stages 202 of converter 200 are replaced with power stages 1502 in converter 1500. Power stages 1502 include the same constituent elements as power stages 202, but with the elements configured in a different topology. Specifically, each power transfer winding 210 is electrically coupled between ground and a switching node X of the respective power stage 1502. The upper and lower switching devices of each power switching stage 208, e.g., switching devices 306 and 308 of FIG. 3, are electrically coupled in series between an input power node 1516 and an output power node 1512. Accordingly, each power switching stage 208 is configured to repeatedly switch its respective switching node X between a voltage $V_{in}$ of input power node 1516 a voltage $V_o$ of output power node 1512. A given power transfer winding 210 in converter 1500 is driven high when its respective switching node X is at voltage $V_{in}$, and the power transfer winding 210 is driven low when its respective switching node X is at voltage $V_o$. For example, power transfer winding 210(1) is driven high when switching node X(1) is at voltage $V_{in}$, and power transfer winding 210(1) is driven low when switching node X(1) is at voltage $V_o$. One or more capacitors 1514 are optionally electrically coupled to output power node 1512.

Injection stage 204 of converter 200 is replaced with an injection stage 1504 in converter 1500. Injection stage 1504 includes the same constituent elements as injection stage 204 but with a different topology. Injection winding 220 is electrically coupled between injection switching node X(3) and an injection output node 1522, and a capacitor 1524 is electrically coupled to injection output node 1522. The upper and lower switching devices of injection switching stage 218, e.g., switching devices 310 and 312 of FIG. 3, are electrically coupled in series between input power node 1516 and output power node 1512. Accordingly, injection switching stage 218 is configured to repeatedly switch switching node X(3) between voltage $V_{in}$ and $V_o$. Injection winding 220 in converter 1500 is driven high when switching node X(3) is at voltage $V_{in}$, and the injection winding is driven low when switching node X(3) is at voltage $V_o$.

Controller 1506, which is an embodiment of controller 206, is configured to generate control signals U and L to control duty cycle of power stages 1502 to regulate at least one parameter of switching power converter 1500. Examples of possible regulated parameters include, but are not limited, magnitude of input voltage $V_{in}$, magnitude of input current $I_{in}$, magnitude of output voltage $V_o$, and magnitude of output current $I_o$. Controller 1506 is optionally configured to generate control signals U and L such that power stages 1502 switch out-of-phase with each other. Controller 1506 is further configured to generate control signals UI and LI to control injection stage 1504 such that the injection stage injects magnetic flux in magnetic core 226 in a manner which reduces voltage across a respective leakage inductance of each power transfer winding 210, such as by compensating for a power transfer winding 210 be driven high or by compensating for a power transfer winding 210 being driven low.

Figure 16A:
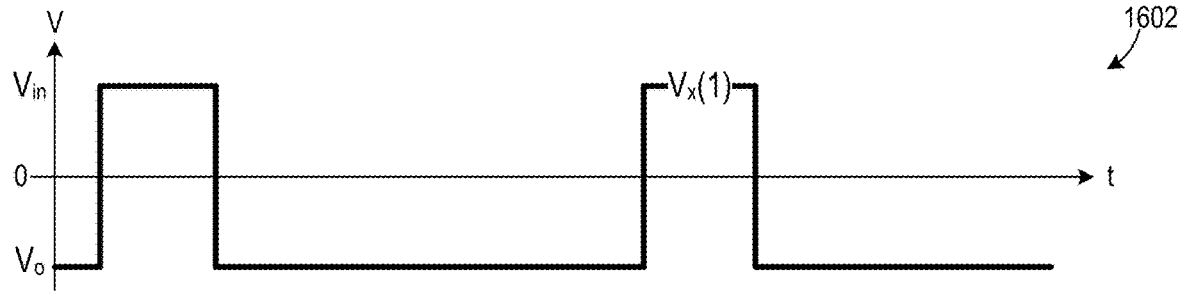
FIGS. 16A-16D are graphs illustrating one example of operation of an embodiment of the FIG. 15 switching power converter.
Figure 16B:
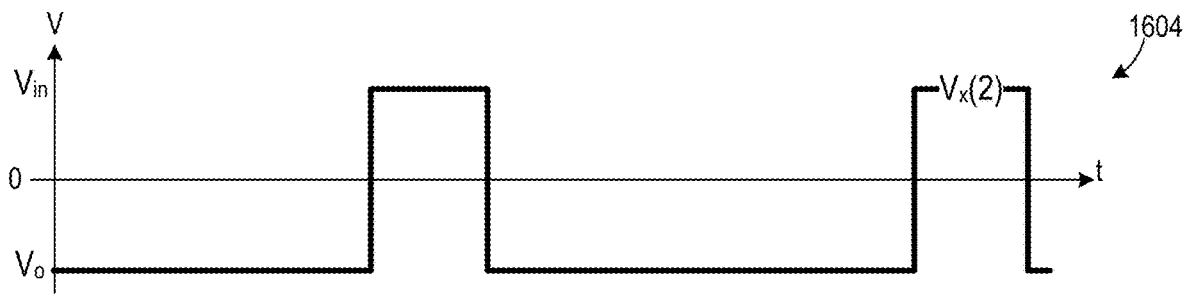
Figure 16C:
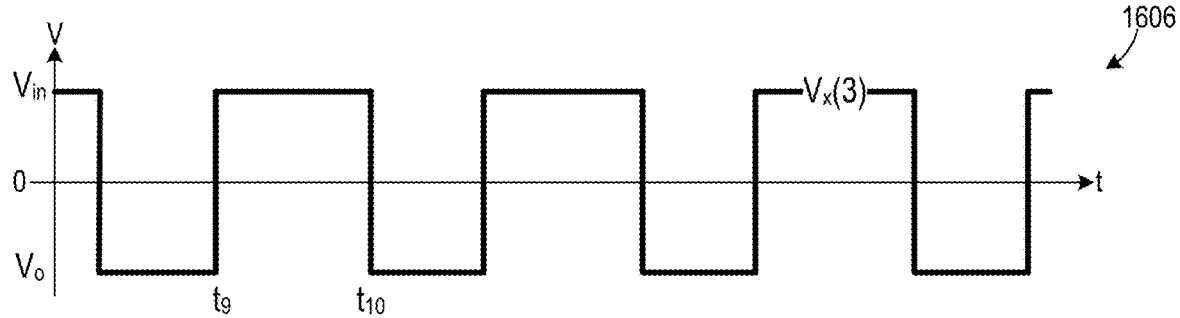
Figure 16D:
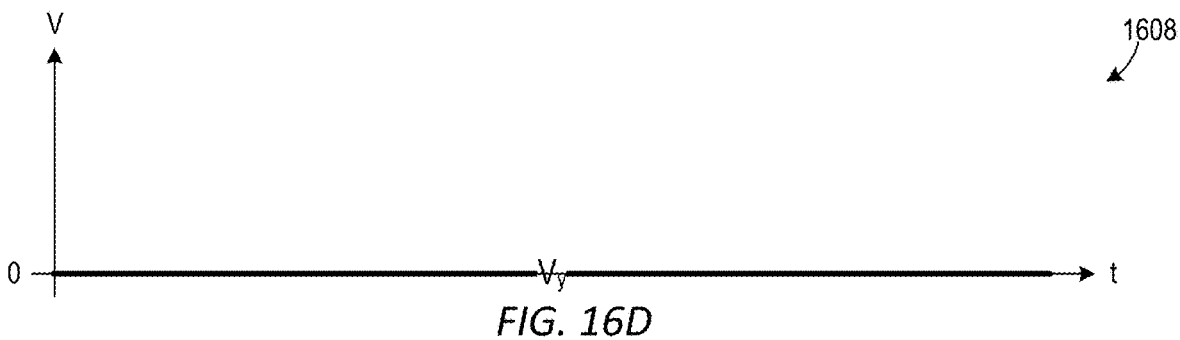

For example, FIGS. 16A-16D are graphs collectively illustrating one example of operation of an embodiment of switching power converter 1500. Graphs 16A-16D assume that the magnetizing inductance value of coupled inductor 228 is much greater than any leakage inductance value of coupled inductor 228. Graph 1602 is a graph of switching node voltage $V_x(1)$ versus time, and graph 1604 is a graph of switching node voltage $V_x(2)$ versus time. FIG. 16C is a graph 1606 including a curve representing voltage at the injection switching node X(3). FIG. 16D is a graph 1608 of intermediate voltages $V_y$ between magnetizing inductances $L_m$ and leakage inductances $L_k$. Each intermediate voltage $V_y$ has essentially the same value due to the magnetizing inductance value of coupled inductor 228 being very large relative to the leakage inductance values.

In the example of FIGS. 16A-16D, controller 1506 controls injection stage 1504 so that injection stage 1504 switches in a manner which compensates for power transfer windings 210 being driven low. Specifically, injection winding 220 is driven high in response to any power transfer winding 210 being driven low, and injection winding 220 is driven low in response to any power transfer winding 210 being driven high, as illustrated in FIGS. 16A-16C. For example, injection winding 220 is driven high at time $t_9$ in response to power transfer winding 210(1) being driven low, and injection winding 220 is driven low at time $t_{10}$ in response to power transfer winding 210(2) being driven high. Consequently, intermediate voltages $V_y$ remain essentially constant at zero volts, as shown in FIG. 16D. Therefore, voltages $V_L$ across leakage inductances $L_k$ remain essentially at zero even as power transfer windings 210 are repeatedly driven between high and low states to regulate one or more parameters of switching power converter 1500. As a result, there is no material ripple current associated with leakage inductance $L_k$, irrespective of operating duty cycle of switching power converter 1500.

Similar to the example of FIGS. 5A-5D, the example of FIGS. 16A-16D assumes essentially ideal magnetic coupling of the windings of coupled inductor 228. However, injection stage 1504 may significantly reduce ripple current magnitude even if non-ideal coupling of coupled inductor 228 prevents injection stage 1504 from completely eliminating ripple current associated with leakage inductances $L_k$. Additionally, while FIGS. 16A-16D assume ideal timing, i.e., that injection stage 1504 switches in synchronicity with power stages 1502, timing may vary while still achieving acceptable operation of switching power converter 1500.

Figure 17:
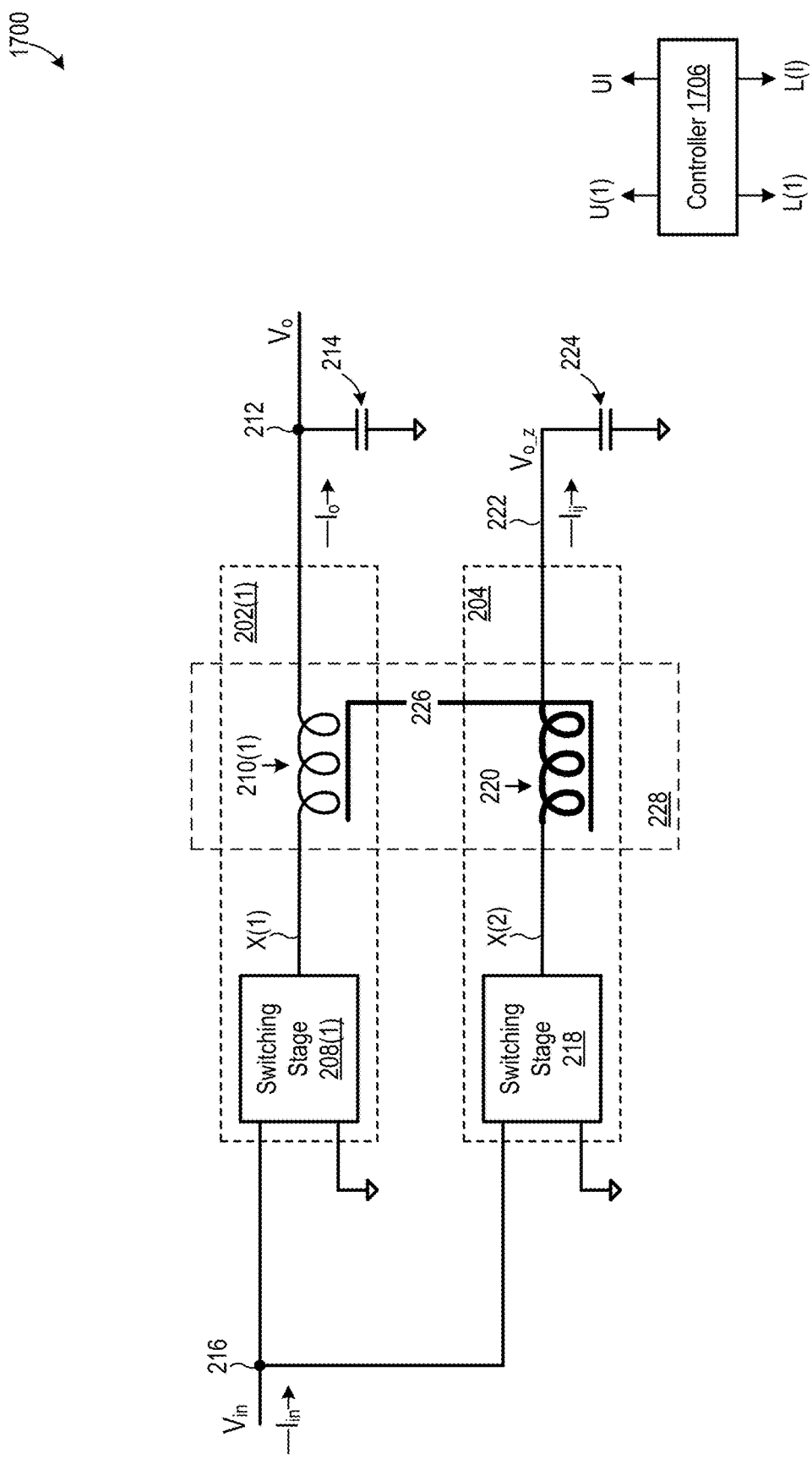
FIG. 17 is a schematic diagram of an alternate embodiment of the FIG. 2 switching power converter having only one phase.

Any of the multi-phase switching power converters including injection stages could be modified to be a single-phase switching power converter. For example, FIG. 17 is a schematic diagram of a switching power converter 1700, which is an alternate embodiment of switching power converter 200 where N is equal to one. Accordingly, switching power converter 1700 is a single-phase switching power converter including one power stage 202(1) and one injection stage 204. Additionally, coupled inductor 228 includes only two windings—i.e., one power transfer winding 210(1) and one injection winding 220.

Controller 1706, which is an embodiment of controller 206, is configured to generate control signals U and L to control duty cycle of power stage 202(1) to regulate at least one parameter of switching power converter 1700. Examples of possible regulated parameters include, but are not limited, magnitude of input voltage $V_{in}$, magnitude of input current $I_{in}$, magnitude of output voltage $V_o$, and magnitude of output current $I_o$. Controller 1706 is further configured to generate control signals UI and LI to control injection stage 204 such that the injection stage injects magnetic flux in magnetic core 226 in a manner which reduces voltage across a leakage inductance of power transfer winding 210(1), such as by compensating for power transfer winding 210(1) be driven high or by compensating for a power transfer winding 210(1) being driven low.

Figure 18A:
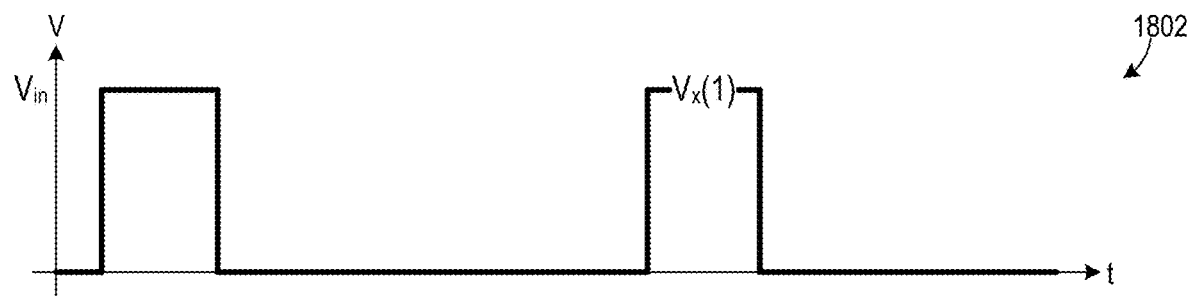
FIGS. 18A-18C are graphs illustrating one example of operation of an embodiment of the FIG. 17 switching power converter.
Figure 18B:
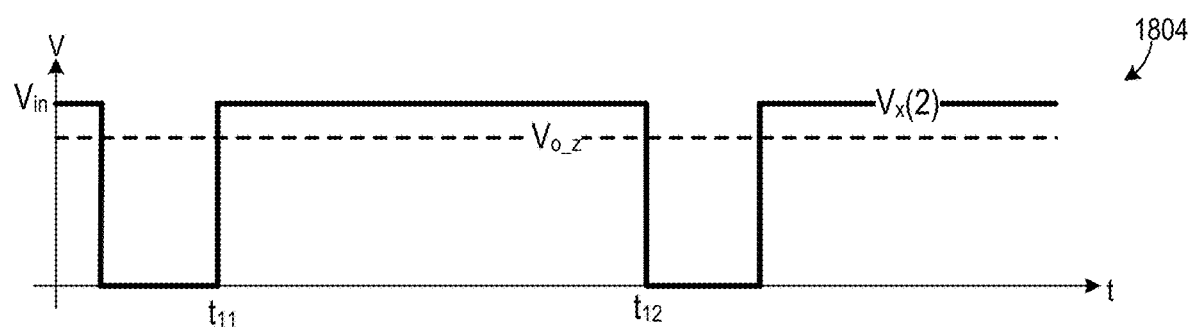
Figure 18C:
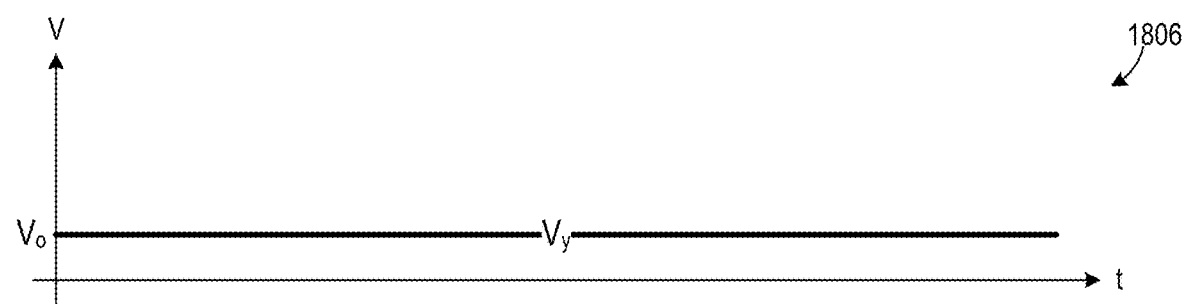

For example, FIGS. 18A-18C are graphs collectively illustrating one example of operation of an embodiment of switching power converter 1700. Graphs 18A-18C assume that the magnetizing inductance value of coupled inductor 228 is much greater than leakage inductance value of coupled inductor 228. Graph 1802 is a graph of switching node voltage $V_x(1)$ versus time. FIG. 18B is a graph 1804 of intermediate voltages $V_y$ between magnetizing inductances $L_m$ and leakage inductances $L_k$. In the example of FIGS. 18A-18C, controller 1706 controls injection stage 204 so that the injection stage switches in a manner which compensates for power transfer winding 210(1) being driven low. Specifically, injection winding 220 is driven high in response to power transfer winding 210(1) being driven low, and injection winding 220 is driven low in response to power transfer winding 210(1) being driven high, as illustrated in FIGS. 18A and 18B. For example, injection winding 220 is driven high at time $t_{11}$ in response to power transfer winding 210(1) being driven low, and injection winding 220 is driven low at time $t_{12}$ in response to power transfer winding 210(1) being driven high. Consequently, intermediate voltage $V_y$ remains essentially constant at output voltage $V_o$, as shown in FIG. 18C. Therefore, voltages $V_L$ across leakage inductance $L_k$ remain essentially at zero even as power transfer winding 210(1) is repeatedly driven between its high and low states to regulate one or more parameters of switching power converter 1700. As a result, there is no material ripple current associated with leakage inductance $L_k$, irrespective of operating duty cycle of switching power converter 1700.

Similar to the example of FIGS. 5A-5D, the example of FIGS. 18A and 18B assumes essentially ideal magnetic coupling of the windings of coupled inductor 228. However, injection stage 204 may significantly reduce ripple current magnitude even if non-ideal coupling of coupled inductor 228 prevents injection stage 204 from completely eliminating ripple current associated with leakage inductance $L_k$. Additionally, while FIGS. 18A-18C assume ideal timing, i.e., that injection stage 204 switches in synchronicity with power stage 202, timing may vary while still achieving acceptable operation of switching power converter 1700.

Referring again to FIG. 17, switching power converter 1700 has a buck-type topology. However, switching power converter 1700 could be modified to have a different type of topology, including but not limited to a boost-type topology or a buck-boost type topology.

While the injection stages of the new switching power converters achieve significant benefits, they may degrade switching power converter transient response. Accordingly, some embodiments of controllers 206, 1306, 1506, and 1706 are configured to disable the injection stage of their respective switching power converter in response to a signal indicating the switching power converter is experiencing a transient event, such as a significant change in load or a significant change in input voltage. In some embodiments, controllers 206, 1306, 1506, and 1706 internally generate the signal indicating the power converter is experiencing a transient event, and in some other embodiments, controllers 206, 1306, 1506, and 1706 receive such signal from an external source. Alternately, some embodiments of controllers 206, 1306, 1506, and 1706 are configured to change timing of the injection stage of their respective switching power converter in response to a signal indicating the switching power converter is experiencing a transient event, such as to help the converter quickly respond to the transient event.

Figure 19:
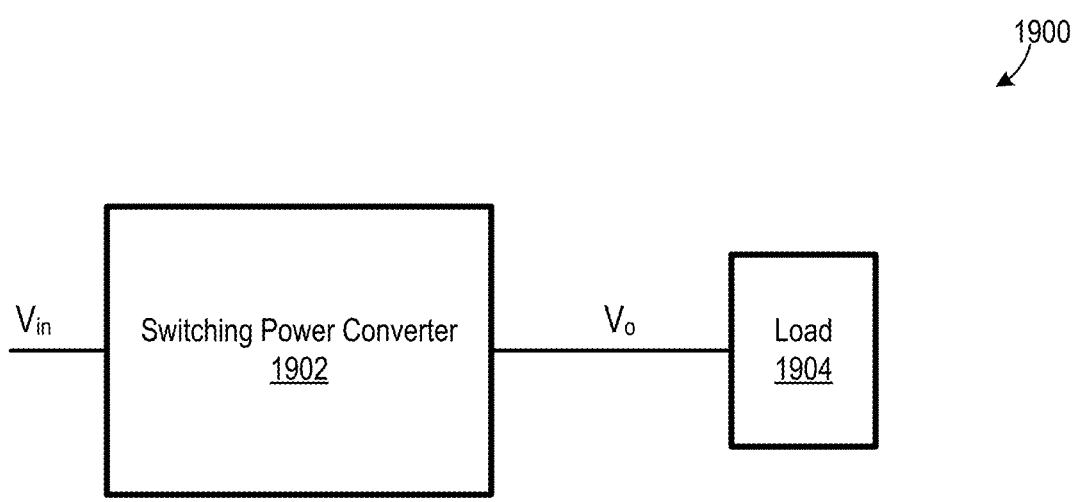
FIG. 19 is a block diagram of an example application of the switching power converters disclosed herein.

FIG. 19 is a block diagram of an electrical system 1900, which is one possible application of the new switching power converters disclosed herein. System 1900 includes a switching power converter 1902 configured to power a load 1904. Switching power converter 1902 may be any one of the new switching power converters disclosed herein. For example, switching power converter 1900 may be any one of switching power converters 200, 700, 900, 1100, 1300, 1500, and 1700. Load 1904 includes, for example, one or more integrated circuits, including but not limited to, a processing unit (e.g. a central processing unit (CPU) or a graphics processing unit (GPU)), a field programmable gate array (FPGA), an application specific integrated circuit (ASIC) (e.g. for artificial intelligence and/or machine learning), and/or a memory unit.

Experimental Results

Discussed below with respect to FIGS. 20-25 are computer simulations of several embodiments of the new switching power converters with injection stages. It is realized, though, that the new switching power converters are not limited to performing according to these simulations.

Figure 20:
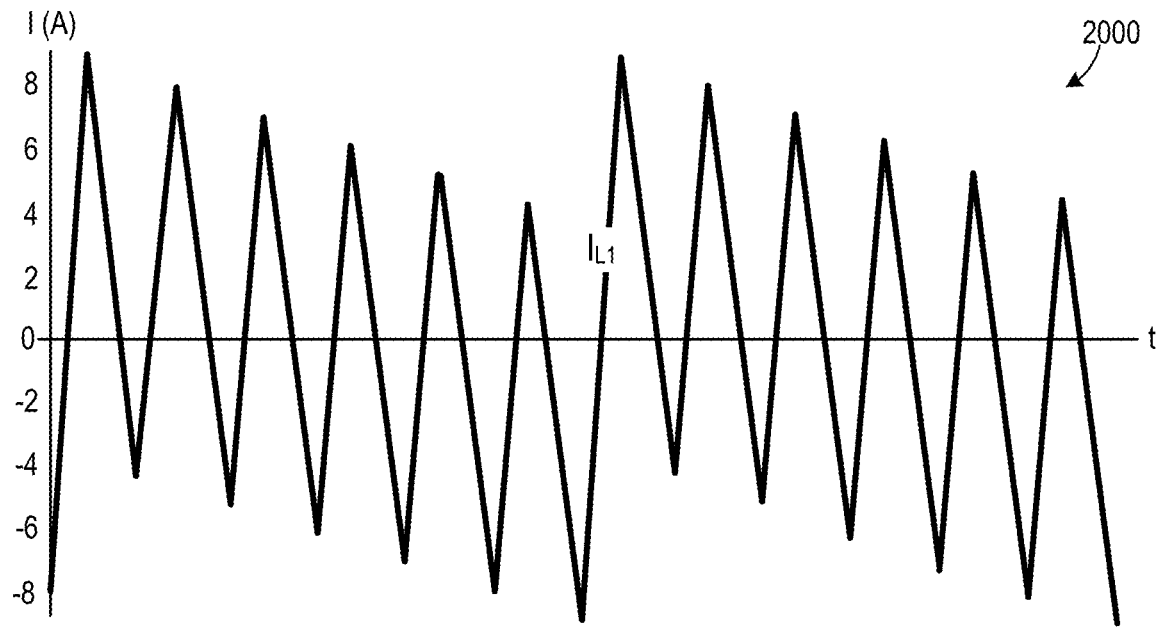
FIG. 20 is a graph illustrating an example of operation of an embodiment of the FIG. 2 switching power converter with an injection stage disabled.
Figure 21:
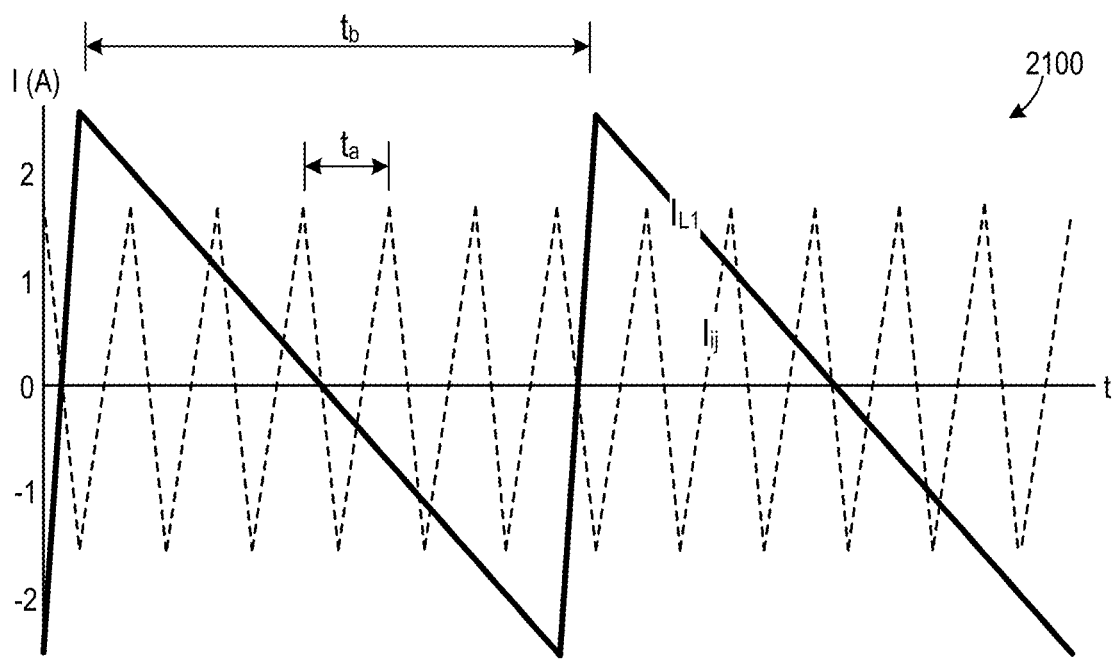
FIG. 21 is a graph illustrating an example of operation of the same embodiment considered in FIG. 20 but with the injection stage enabled.

FIG. 20 is a graph 2000 of power phase 202(1) current $I_{L1}$ (see FIG. 2) versus time in an embodiment of switching power converter 200 where (a) N is equal to six, (b) magnetizing inductance is 300 nanohenries (nH), (c) each leakage inductance is 15 nH, (d) switching frequency is 400 kilohertz (KHz) per power stage, and (d) injection stage 204 is disabled. This example shows a Vin=12V, Vo=0.8V application. As shown in FIG. 20, peak-to-peak ripple current associated with leakage inductance is relatively large, i.e., over 12 amperes. Additionally, there is a ripple current component associated with magnetizing inductance. FIG. 21 is a graph 2100 of current versus time of the same power converter that was simulated in graph 2000 but with injection stage 204 enabled. FIG. 21 includes a curve representing current $I_{L1}$ as well as a curve representing current $I_{ij}$ (see FIG. 2) through injection stage 204. Current $I_{ij}$ has a frequency $1/t_a$ which is equal to the switching frequency of the switching power converter. However, injection stage 204 eliminates ripple current resulting from leakage inductances, such that the only ripple current component in current $I_{L1}$ is ripple current associated with magnetizing inductance of coupled inductor 228. The ripple current associated with magnetizing inductance has a much smaller peak-to-peak value of approximately six amperes, as well as a much smaller frequency of $1/t_b$. Thus, the simulations of FIGS. 20 and 21 show that injection stage 204 is capable of significantly reducing ripple current magnitude. Additionally, it should be noted that the simulations of FIGS. 20 and 21 do not assume ideal magnetic coupling of coupled inductor 228—instead, the ratio of magnetizing inductance to leakage inductance is 20 in these simulations. Performance would improve with a larger ratio of magnetizing inductance to leakage inductance.

Figure 22:
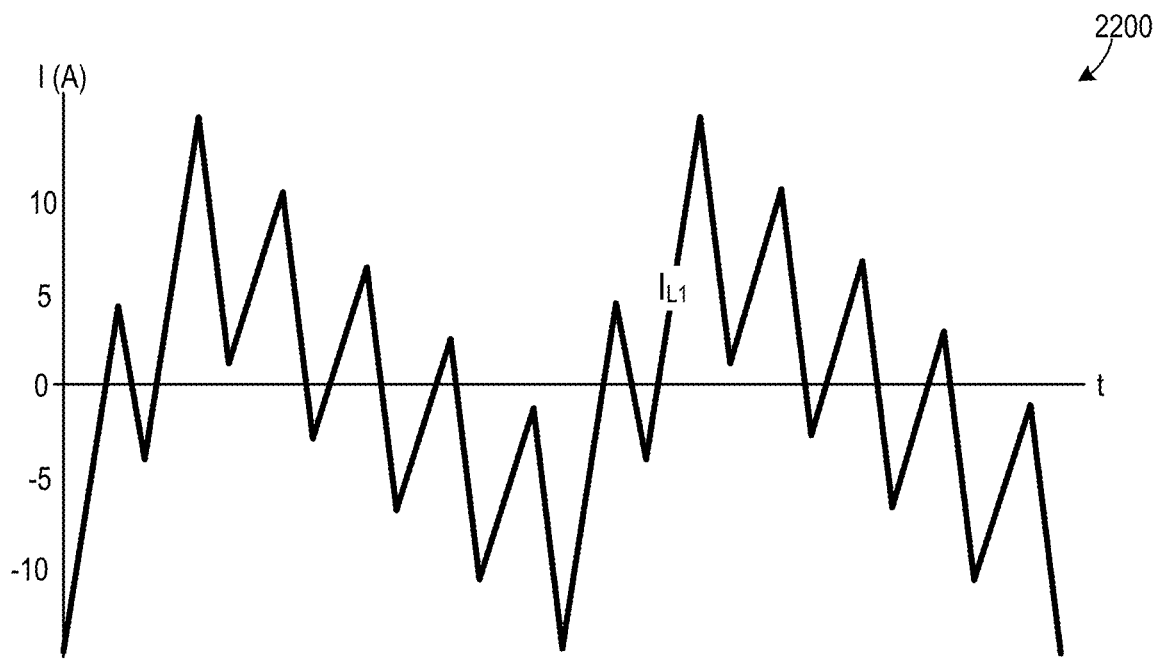
FIG. 22 is a graph illustrating an example of operation of another embodiment of the FIG. 2 switching power converter with an injection stage disabled.
Figure 23:
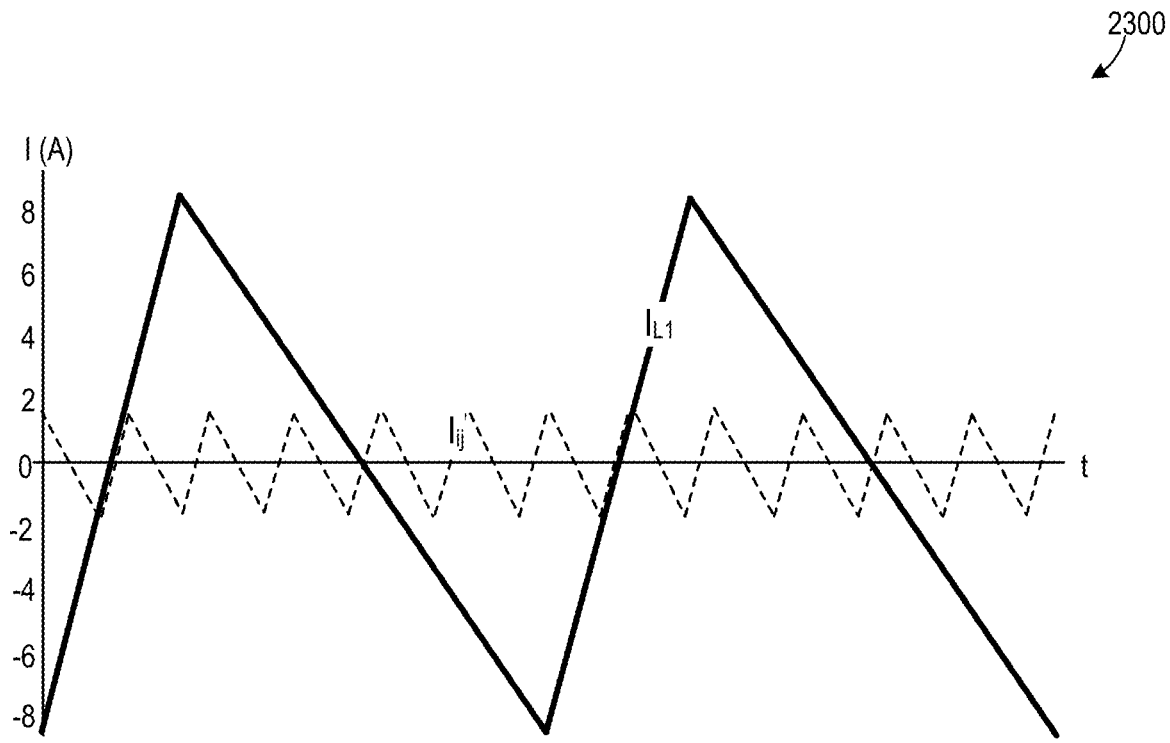
FIG. 23 is a graph illustrating an example of operation of the same embodiment considered in FIG. 22 but with the injection stage enabled.

FIGS. 22 and 23 illustrate an operating example of the same switching power converter as simulated with respect to FIGS. 20 and 21 but with larger duty cycle so that switching node waveforms overlap. This example shows a Vin=12V, Vo=3.3V application. Specifically, FIG. 22 is a graph 2200 of power phase 202(1) current $I_{L1}$ versus time with injection stage 204 disabled, and FIG. 23 is graph 2300 of each of current $I_{L1}$ and current $I_{ij}$ versus time within injection stage 204 enabled. These two graphs show that injection stage 204 reduced peak-to-peak ripple current magnitude from approximately 29 amperes to 16 amperes. The relative reduction in ripple current magnitude is smaller than in the example of FIGS. 20 and 21 because a portion of total ripple current that is associated with magnetizing inductance increases within increasing duty cycle.

Figure 24:
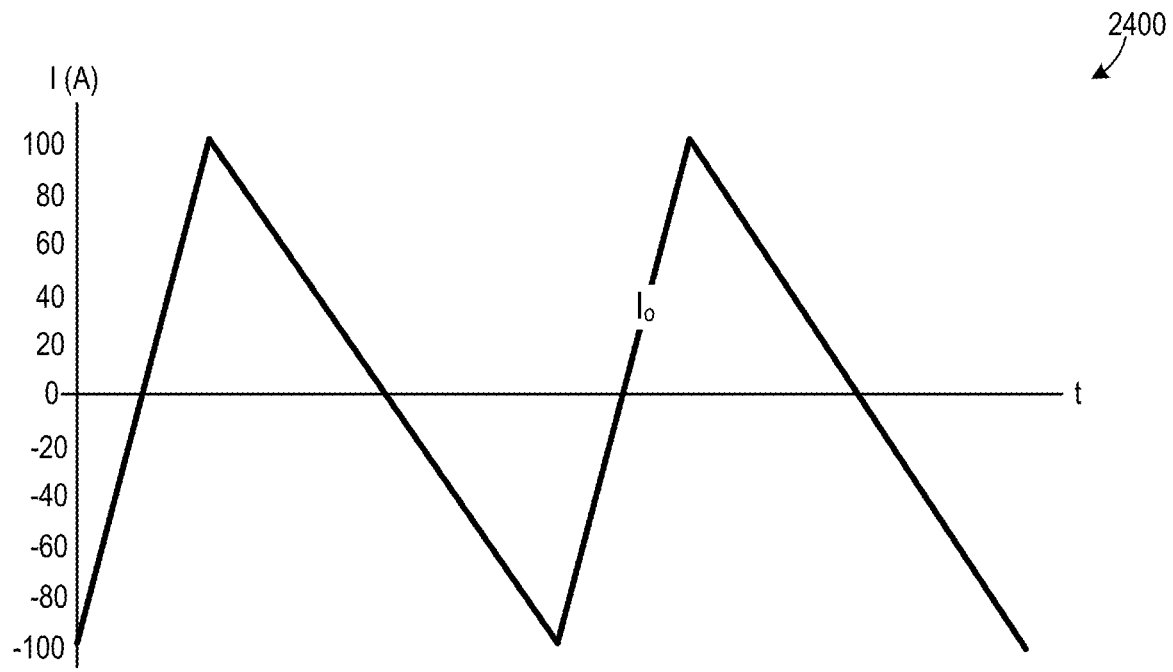
FIG. 24 is a graph illustrating an example of operation of an embodiment of the FIG. 17 switching power converter with an injection stage disabled.
Figure 25:
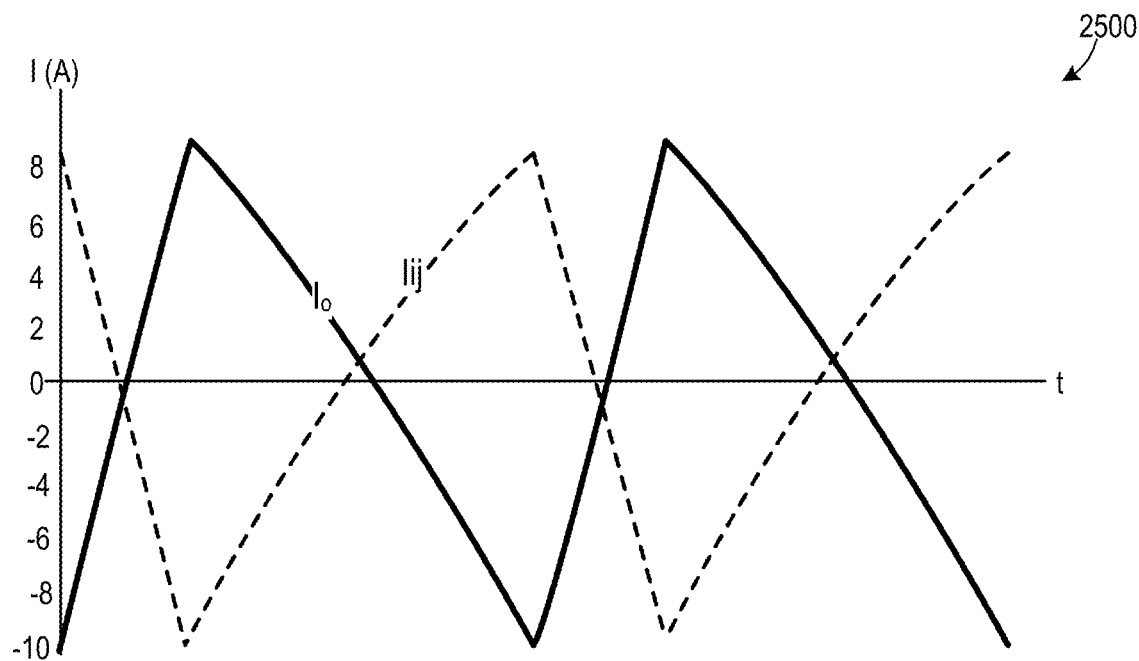
FIG. 25 is a graph illustrating an example of operation of the same embodiment considered in FIG. 24 but with the injection stage enabled.

FIG. 24 is a graph 2400 of output current $I_o$ versus time in an embodiment of single-phase switching power converter 1700 where (a) magnetizing inductance is 300 nH, (b) each leakage inductance is 15 nH, (c) switching frequency is 400 kilohertz KHz, and (d) injection stage 204 is disabled. This example shows a Vin=12V, Vo=3.3V application. Peak-to-peak ripple current magnitude is very large in this example, i.e., peak-to-peak ripple current magnitude is approximately 200 amperes. FIG. 25 is a graph 2100 of current versus time of the same power converter that was simulated in graph 2400 but with injection stage 204 enabled. FIG. 25 includes a curve representing current $I_o$ as well as a curve representing current Peak-to-peak ripple current is only approximately 19 amperes with injection stage 204 enabled, thereby further showing that injection stage 204 is effective in reducing ripple current magnitude.

Asymmetrical Coupled Inductors

Figure 26:
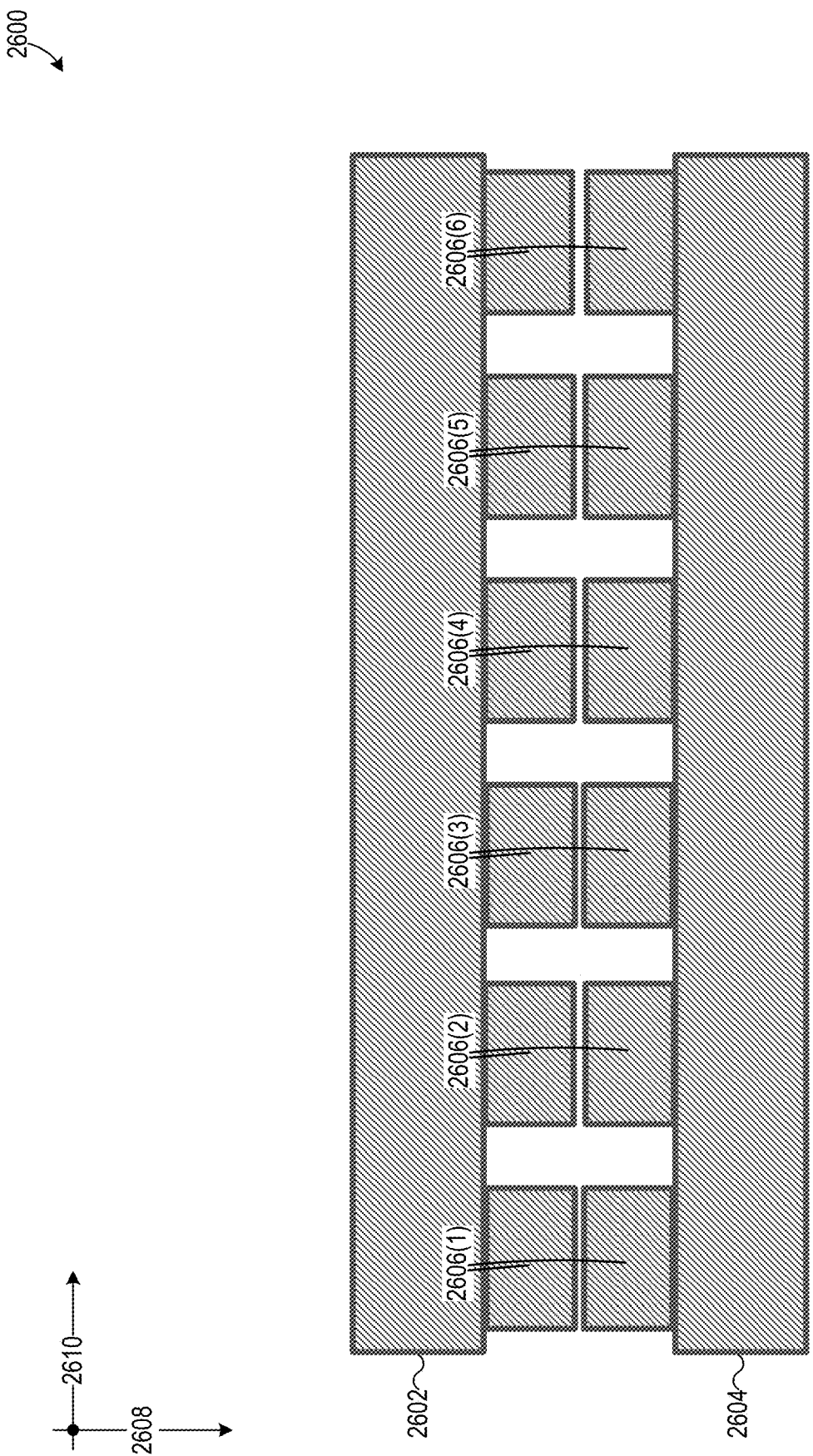
FIG. 26 is a plan view of a magnetic core.

Referring again to FIG. 2, Applicant has found that it may be advantageous for coupled inductor 228 to be configured such that a portion of magnetic core 226 including injection winding 220 has a higher saturation current rating than portions of magnetic core 226 including power transfer windings 210. Consider FIG. 26, which is a plan view of a magnetic core 2600. Magnetic core 2600 is one possible embodiment of magnetic core 226 where N is equal to five, i.e., where the magnetic core supports five power transfer windings 210 and one injection winding 220. Magnetic core 2600 has a "ladder" configuration. Accordingly, magnetic core 2600 includes a first rail 2602, a second rail 2604 and N+1 rungs 2606, where first rail 2602, second rail 2604, and rungs 2606 are formed of a magnetic material, such as a ferrite magnetic material and/or a powered iron magnetic material. First rail 2602 and second rail 2604 are separated from each other in a direction 2608, and each rung 2606 is disposed between first rail 2602 and second rail 2604 in direction 2608. Each rung 2606 is separated from each other rung 2606 in a direction 2610, where direction 2610 is orthogonal to direction 2608. While not required, each rung 2606 may form a gap in direction 2608, such as illustrated in FIG. 26. A respective power transfer winding 210 (not shown in FIG. 26) may be wound around each rung 2606(1)-2606(5), and an injection winding 220 (not shown in FIG. 26) may be wound around rung 2606(6). Accordingly, magnetic core 2600 is capable of magnetically coupling five power transfer windings 210 and one injection winding 220. The shown core has no dedicated leakage features, such as leakage plates on top, or leakage rungs side by side with main rungs 2606(1)-2606(5) associated with power transfer windings. Accordingly, magnetic core 2600 is optimized for the largest mutual inductance between the windings in a given size, as expected current ripple cancellation is very high and the leakage value can therefore be set to a minimum value. However, if an increased leakage value is needed, dedicated leakage features can be added to the core. For example, a leakage plate can be added to the top of magnetic core 2600, or leakage rungs can be added on the side of main rungs 2606(1)-2606(5).

Figure 27:
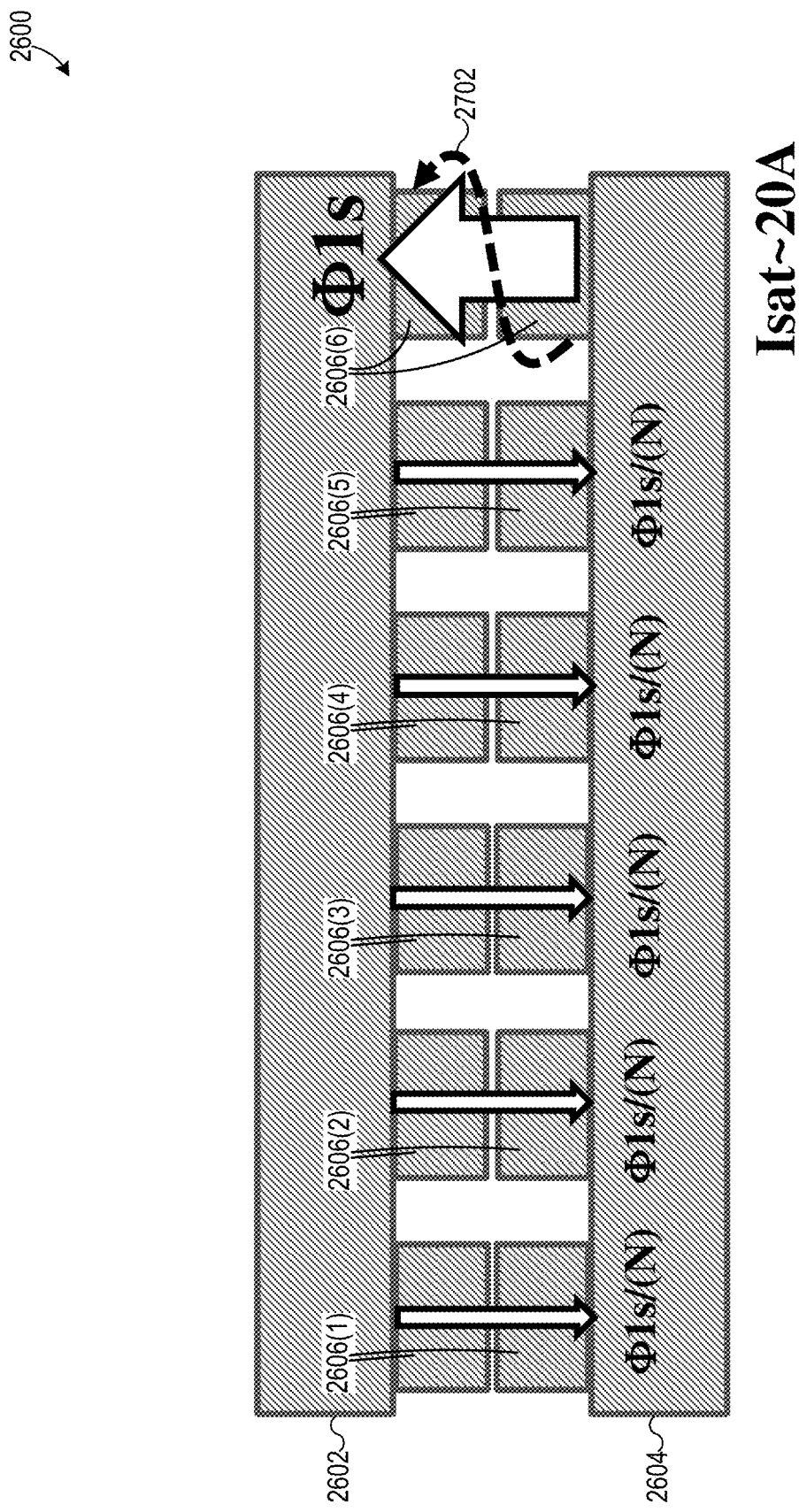
FIG. 27 is a plan view of the FIG. 26 magnetic core illustrating one example of magnetic flux flowing through the magnetic core.

Magnetic core 2600 is configured such that each rung 2606 has a saturation current rating of 20 amperes, when a single-turn winding is wound around the rung. FIG. 27 is a plan view of magnetic core 2600 illustrating an example of magnetic flux flow resulting from a current 2702 of 20 Amperes flowing through a single-turn injection winding (not shown) wound around rung 2606(6). This current generates a magnetic flux of φ1s flowing through rung 2606(6). Assume that this flux Φ1s corresponds to the maximum flux before saturation of the rung 2606(6). Magnetic flux Φ1s/N is equally divided among remaining rungs 2606(1)-2606(5), and a magnetic flux of Φ1s/N therefore flows through each rung 2606(1)-2605(5). Accordingly, magnetic core 2600 operates within its saturation current rating when a current of 20 Amperes flows through a single-turn injection winding wound around rung 2606(6).

Figure 28:
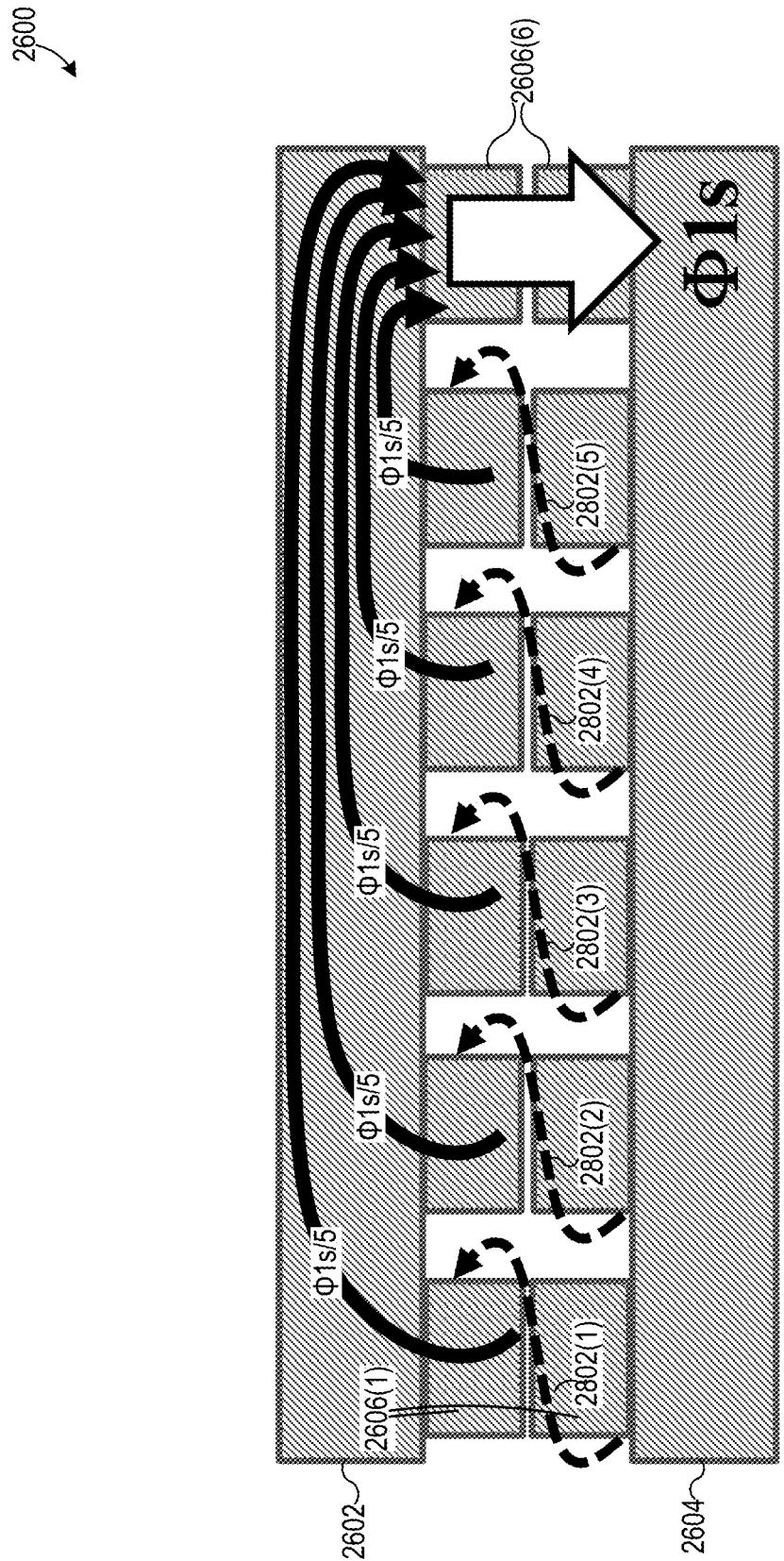
FIG. 28 is a plan view of the FIG. 26 magnetic core illustrating another example of magnetic flux flowing through the magnetic core.

In contrast, consider FIG. 28, which is a plan view of magnetic core 2600 where a current 2802 of 20 amperes flows simultaneously through a respective power transfer winding (not shown) wound around each rung 2606(1)-2606(5). Only two instances of rungs 2606, i.e., rungs 2606(1) and 2606(6), are labeled in FIG. 28 for illustrative clarity. Each current 2802 generates a magnetic flux of Φ1s flowing through its respective rung 2606, and each such flux is then divided by returning through the other rungs. The FIG. 28 example has five currents 2802 generating five fluxes, and each flux is divided into five approximately equal parts in return paths in rungs 2606. Accordingly, magnetic fluxes Φ1s/N combine in rung 2606(6), such that a magnetic flux of N*Φ1s/N=Φ1s flows through rung 2606(6). This implies that the maximum current in the main phases (corresponding to rungs 2606(1)-2606(5)) has to be limited to the current that saturates $L_m$ in a single rung 2606 of the core in FIGS. 27 and 28. Typically, $I_{sat}$ of $L_m$ is much smaller as compared to the $I_{sat}$ rating of a coupled inductor where all phases carry the same load current and only much smaller leakage inductance is exposed to that load current (a common DC component of the load current cancels flux in $L_m$ when all phases have the same $I_o$/phase). Increasing the load range of the coupled inductor with injection phase in FIGS. 27 and 28 is therefore desired.

Figure 29:
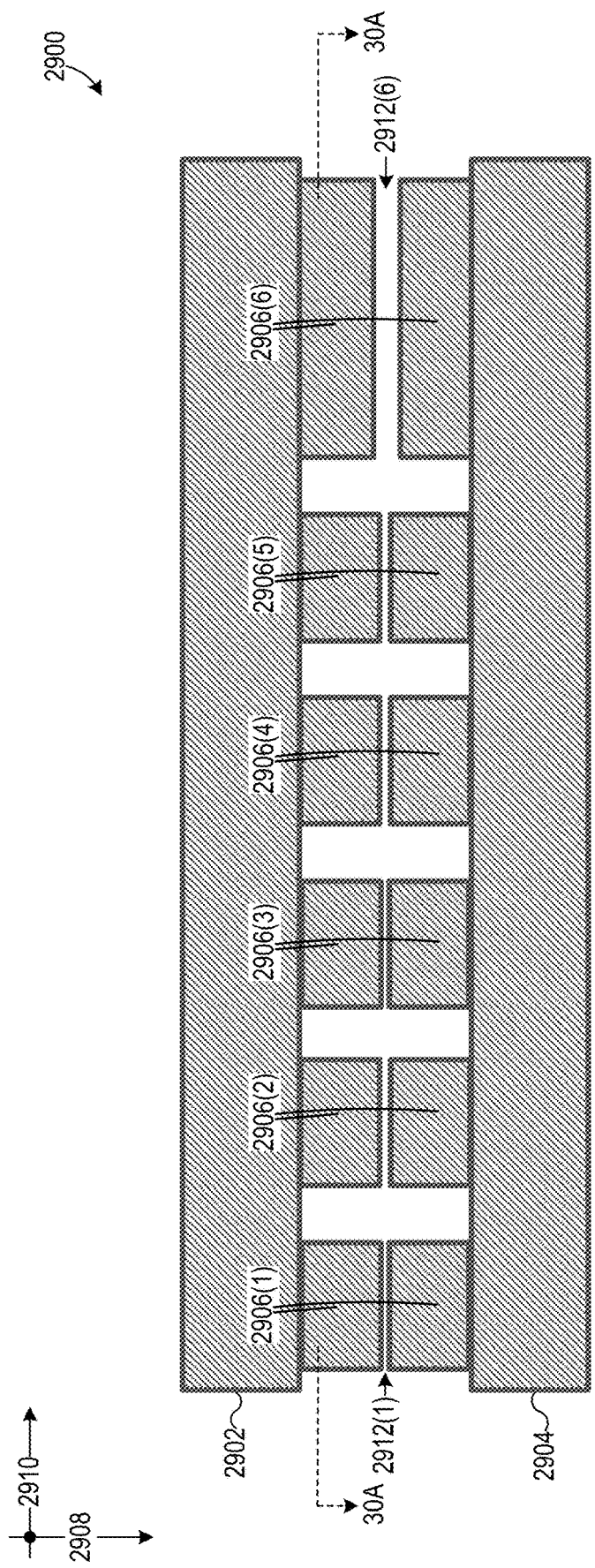
FIG. 29 is a plan view of an asymmetric magnetic core, according to an embodiment.
Figure 30:
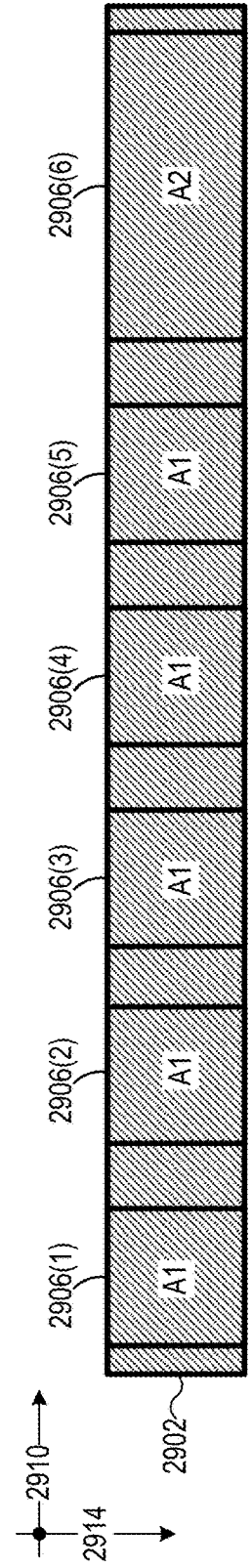
FIG. 30 is a cross-sectional view of the FIG. 29 magnetic core.

This limitation on power transfer winding current magnitude can be mitigated by increasing saturation current rating of rung 2606(6) relative to remaining rungs 2606(1)-2606(5) of magnetic core 2600, such as by increasing cross-sectional area of rung 2606(6). For example, FIG. 29 is a plan view of an asymmetrical magnetic core 2900, which is similar to magnetic core 2600 but where one rung has a larger cross-sectional area than the remaining rungs. FIG. 30 is a cross-sectional view of magnetic core 2900 taken along line 30A-30A of FIG. 29. Magnetic core 2900 includes a first rail 2902, a second rail 2904, and N+1 rungs 2906, where N is equal to five in this embodiment. First rail 2902, second rail 2904, and rungs 2906 are formed of a magnetic material, such as a ferrite magnetic material and/or a powered iron magnetic material.

First rail 2902 and second rail 2904 are separated from each other in a direction 2908, and each rung 2906 is disposed between first rail 2902 and second rail 2904 in direction 2908. Each rung 2906 is separated from each other rung 2906 in a direction 2910, where direction 2910 is orthogonal to direction 2908. While not required, each rung 2906 may form a gap 2912 in direction 2908. Only two instances of gaps 2912, i.e., gaps 2912(1) and 2912(6), are labeled in FIG. 29 for illustrative clarity. In certain embodiments, a thickness of gap 2912(6) in direction 2908 is greater than a respective thickness of each other gap 2912 in direction 2908, such as to help reduce susceptibility of rung 2906(6) to magnetic saturation.

As illustrated in FIG. 30, each rung 2906(1)-2906(5) has a cross-sectional area A1 in a plane extending in direction 2910 and in a direction 2914, where direction 2914 is orthogonal to each of directions 2908 and 2910. Additionally, rung 2906(6) has a cross-sectional area A2 in a plane extending in directions 2910 and 2914. Importantly, cross-sectional area A2 is greater than cross-sectional area A1. The relatively large cross-sectional area A2 of rung 2906(6)

raises the saturation current rating of rung 2906(6) relative to other rungs 2906(1)-2906(5), which advantageously increases permissible simultaneous current magnitude of power transfer windings wound around rungs 2906(1)-2906(5), relative to magnetic core 2600 of FIG. 26. Accordingly in certain embodiments, maximum permissible magnitude of current simultaneously flowing through each power transfer winding must not exceed $I_{sat}$, instead of being limited to $I_{sat}/N$.

The number of rungs 2906 of magnetic core 2900 may vary without departing from the scope hereof. Additionally, while FIGS. 29 and 30 illustrate magnetic core 2900 as having rectangular cross-sectional areas, magnetic core 2900 could be modified so that one or more portions of the magnetic core have different-shaped cross-sectional areas, such as rounded-rectangular cross-sectional areas. Additionally, while each of rungs 2906(1)-2906(5) has an identical configuration in magnetic core 2900, magnetic core 2900 could be modified so that two or more rungs 2906(1)-2906(5) have different respective configurations, such as different cross-sectional areas. The shown core has no dedicated leakage features, such as leakage plates on top, or leakage rungs side by side with the main rungs 2906(1)-2906(5) associated with power transfer windings. Accordingly, magnetic core 2900 is optimized for the largest mutual inductance between the windings in a given size, as expected current ripple cancellation is very high and the leakage value can be set to a minimum value. However, if an increased leakage value is needed, one or more dedicated leakage features can be added to magnetic core 2900, including but not limited to a leakage plate on top of the core and/or leakage rungs on the side of rungs 2906(1)-2906(5).

Figure 31:
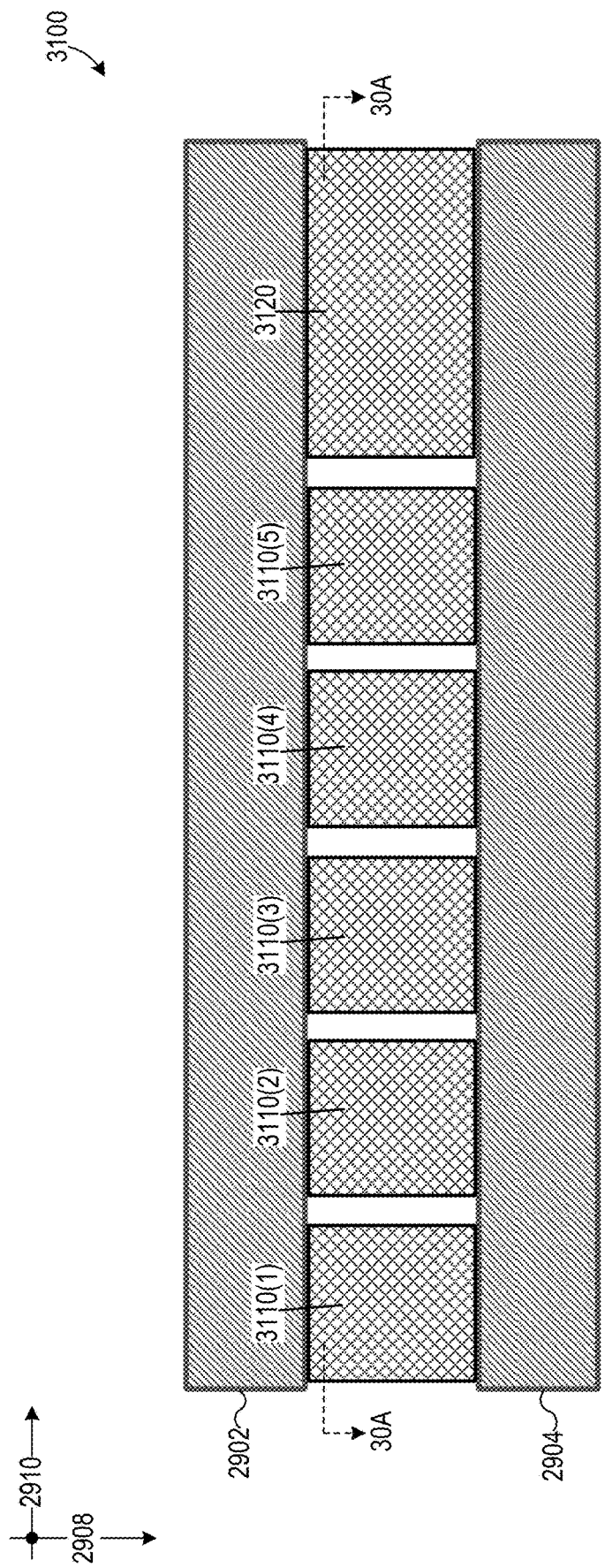
FIG. 31 is a plan view of a coupled inductor including an instance of the FIG. 29 magnetic core, according to an embodiment.
Figure 32:
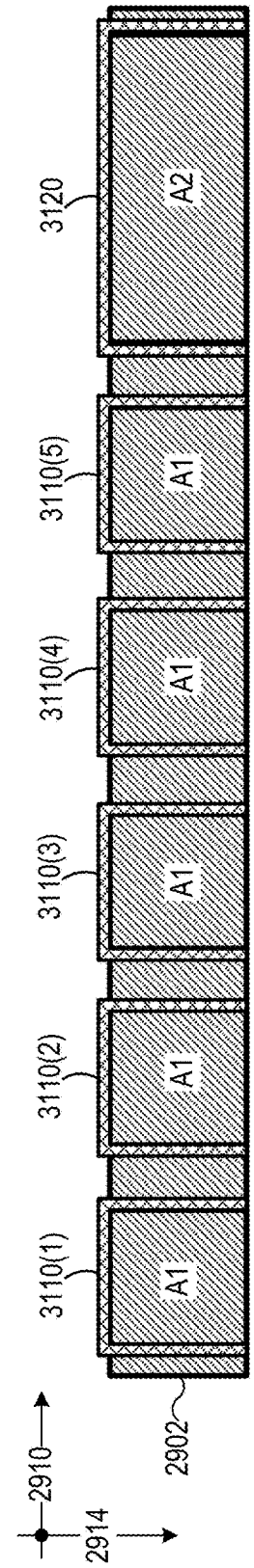
FIG. 32 is a cross-sectional view of the FIG. 31 coupled inductor.

FIG. 31 is a top plan view of a coupled inductor 3100, which is one embodiment of a coupled inductor including an instance of magnetic core 2900 of FIGS. 29 and 30. FIG. 32 is a cross-sectional view of coupled inductor 3100 taken along line 32A-32A of FIG. 31. Coupled inductor 3100 includes a respective power transfer winding 3110 wound around each rung 2906(1)-2906(5), as well as an injection winding 3120 wound around rung 2906(6). Power transfer windings 3110 are embodiments of power transfer windings 210 of FIG. 2, and injection winding 3120 is an embodiment of injection winding 220 of FIG. 2. Accordingly, coupled inductor 3100 is one possible embodiment of coupled inductor 228 of FIG. 2.

Although FIGS. 31 and 32 depict windings 3110 and 3120 as being single-turn metallic foil windings, any of these windings could have a different configuration. For example, one or more of windings 3110 and 3120 could be metallic wire windings instead of metallic foil windings. As another example, one or more of windings 3110 and 3120 could be multi-turn windings.

Combinations of Features

Features described above may be combined in various ways without departing from the scope hereof. The following examples illustrate some possible combinations.

(A1) A method for operating a switching power converter to reduce ripple current magnitude includes (1) controlling duty cycle of a plurality power stages of the switching power converter to regulate at least one parameter of the switching power converter, each power stage including a respective power transfer winding that is magnetically coupled to the respective power transfer winding of each other power stage, and (2) controlling an injection stage of the switching power converter to reduce voltage across a respective leakage inductance of each power transfer winding, the injection stage including an injection winding that is magnetically coupled to each power transfer winding.

(A2) The method denoted as (A1) may further include causing the plurality of power stages to switch out-of-phase with respect to each other.

(A3) In any one of the methods denoted as (A1) and (A2), controlling the injection stage to reduce voltage across the respective leakage inductance of each power transfer winding may include driving the injection winding high in response to a power transfer winding being driven low.

(A4) In any one of the methods denoted as (A1) and (A2), controlling the injection stage to reduce voltage across the respective leakage inductance of each power transfer winding may include driving the injection winding high in response to one of the power transfer windings being driven low while at least one of the remaining power transfer windings are driven high.

(A5) In any one of the methods denoted as (A1) and (A2), controlling the injection stage to reduce voltage across the respective leakage inductance of each power transfer winding may include causing the injection stage to compensate for one or more of the power transfer windings being driven low.

(A6) In any one of the methods denoted as (A1) and (A2), controlling the injection stage to reduce voltage across the respective leakage inductance of each power transfer winding may include driving the injection winding high in response to one of the power transfer windings being driven high.

(A7) In any one of the methods denoted as (A1) and (A2), controlling the injection stage to reduce voltage across the respective leakage inductance of each power transfer winding may include causing the injection stage to compensate for one or more of the power transfer windings being driven high.

(A8) Any one of the methods denoted as (A1) through (A7) may further include disabling the injection stage in response to a signal indicating that the switching power converter is experiencing a transient event.

(A9) Any one of the methods denoted as (A1) through (A7) may further include controlling the injection stage to change timing of switching of the injection stage in response to a signal indicating that the switching power converter is experiencing a transient event.

(A10) In any one of the methods denoted as (A1) through (A9), the at least one parameter of the switching power converter may include one of magnitude of a voltage and magnitude of a current (A11) In any one of the methods denoted as (A1) through (A10), the plurality of power transfer windings and the injection winding may be part of a common coupled inductor.

(A12) In the method denoted as (A11), the common coupled inductor may include an asymmetric magnetic core.

(A13) In any one of the methods denoted as (A1) through (A12), the switching power converter may have a topology selected from the group consisting of a multi-phase buck-type topology, a multi-phase boost-type topology, and a multi-phase buck-boost-type topology.

(A14) In any one of the methods denoted as (A1) through (A13), two or more of the plurality of power stages may be part of different respective power sub-converters.

(B1) A method for operating a switching power converter to reduce ripple current magnitude may include (1) controlling duty cycle of a power stage of the switching power converter to regulate at least one parameter of the switching power converter, the power stage including a power transfer winding, and (2) controlling an injection stage of the switching power converter to reduce voltage across a leakage inductance of the power transfer winding, the injection stage including an injection winding that is magnetically coupled to the power transfer winding.

(B2) In the method denoted as (B1), controlling the injection stage to reduce voltage across the leakage inductance of the power transfer winding may include driving the injection winding high in response to the power transfer winding being driven low.

(B3) In the method denoted as (B1), controlling the injection stage to reduce voltage across the leakage inductance of the power transfer winding may include causing the injection stage to compensate for the power transfer winding being driven low.

(B4) In the method denoted as (B1), controlling the injection stage to reduce voltage across the leakage inductance of the power transfer winding may include driving the injection winding high in response to the power transfer winding being driven high.

(B5) In the method denoted as (B1), controlling the injection stage to reduce voltage across the leakage inductance of the power transfer winding may include causing the injection stage to compensate for the power transfer winding being driven high.

(B6) Any one of the methods denoted as (B1) through (B5) may further include disabling the injection stage in response to a signal indicating that the switching power converter is experiencing a transient event.

(B7) Any one of the methods denoted as (B1) through (B5) may further include controlling the injection stage to change timing of switching of the injection stage in response to a signal indicating that the switching power converter is experiencing a transient event.

(B8) In any one of the methods denoted as (B1) through (B7), the at least one parameter of the switching power converter may include one of magnitude of a voltage and magnitude of a current.

(B9) In any one of the methods denoted as (B1) through (B8), the switching power converter may have a topology selected from the group consisting of a buck-type topology, a boost-type topology, and a buck-boost-type topology.

(C1) A switching power converter includes (1) a plurality of power stages, each power stage including a respective power transfer winding that is magnetically coupled to the respective power transfer winding of each other power stage, (2) an injection stage including an injection winding that is magnetically coupled to each power transfer winding, and (3) a controller configured to (a) control duty cycle of the plurality power stages to regulate at least one parameter of the switching power converter and (b) control the injection stage to reduce voltage across a respective leakage inductance of each power transfer winding.

(C2) In the switching power converter denoted as (C1), each power stage may include a respective power switching stage electrically coupled to the power transfer winding of the power stage, each power switching stage being at least partially controlled by the controller, and the injection stage may include an injection switching stage electrically coupled to the injection winding, where the injection switching stage is at least partially controlled by the controller.

(C3) In the method denoted as (C2), the injection winding may be electrically coupled between the injection switching stage and a capacitor.

(C4) In any one of the methods denoted as (C1) through (C3), the controller may be further configured to cause the plurality of power stages to switch out-of-phase with respect to each other.

(C5) In any one of the methods denoted as (C1) through (C4), the controller may be further configured to control the injection stage to reduce voltage across the respective leakage inductance of each power transfer winding at least partially by causing the injection winding to be driven high in response to a power transfer winding being driven low.

(C6) In any one of the methods denoted as (C1) through (C4), the controller may be further configured to control the injection stage to reduce voltage across the respective leakage inductance of each power transfer winding at least partially by causing the injection winding to be driven high in response to one of the power transfer windings being driven low while at least one of the remaining power transfer windings are driven high.

(C7) In any one of the methods denoted as (C1) through (C4), the controller may be further configured to control the injection stage to reduce voltage across the respective leakage inductance of each power transfer winding at least partially by causing the injection winding to be driven high in response to one of the power transfer windings being driven high.

(C8) In any one of the methods denoted as (C1) through (C7), the controller may be further configured to disable the injection stage in response to a signal indicating that the switching power converter is experiencing a transient event.

(C9) In any one of the methods denoted as (C1) through (C7), the controller may be further configured to cause the injection stage to change timing of switching of the injection stage, in response to a signal indicating that the switching power converter is experiencing a transient event.

(C10) In any one of the methods denoted as (C1) through (C9), the at least one parameter of the switching power converter may include one of magnitude of a voltage and magnitude of a current.

(C11) In any one of the methods denoted as (C1) through (C10), the plurality of power transfer windings and the injection winding may be part of a common coupled inductor.

(C12) In the method denoted as (C11), the coupled inductor may be asymmetrical.

(C13) In any one of the methods denoted as (C1) through (C12), the injection stage may be powered from a different power node than plurality of power stages.

(C14) In any one of the methods denoted as (C1) through (C13), the switching power converter may have a topology selected from the group consisting of a multi-phase buck-type topology, a multi-phase boost-type topology, and a multi-phase buck-boost-type topology.

(C15) In any one of the methods denoted as (C1) through (C14), two or more of the plurality of power stages may be part of different respective power sub-converters.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for operating a switching power converter to reduce ripple current magnitude, comprising:

controlling duty cycle of a plurality power stages of the switching power converter to regulate at least one parameter of the switching power converter, each power stage including a respective power transfer winding that is magnetically coupled to the respective power transfer winding of each other power stage; and controlling an injection stage of the switching power converter to reduce voltage across a respective leakage inductance of each power transfer winding, the injection stage including an injection winding that is magnetically coupled to each power transfer winding.

2. The method of claim 1, further comprising causing the plurality of power stages to switch out-of-phase with respect to each other.

3. The method of claim 2, wherein controlling the injection stage to reduce voltage across the respective leakage inductance of each power transfer winding comprises driving the injection winding high in response to a power transfer winding being driven low.

4. The method of claim 2, wherein controlling the injection stage to reduce voltage across the respective leakage inductance of each power transfer winding comprises driving the injection winding high in response to one of the power transfer windings being driven low while at least one of the remaining power transfer windings are driven high.

5. The method of claim 2, wherein controlling the injection stage to reduce voltage across the respective leakage inductance of each power transfer winding comprises causing the injection stage to compensate for one or more of the power transfer windings being driven low.

6. The method of claim 2, wherein controlling the injection stage to reduce voltage across the respective leakage inductance of each power transfer winding comprises driving the injection winding high in response to one of the power transfer windings being driven high.

7. The method of claim 2, wherein controlling the injection stage to reduce voltage across the respective leakage inductance of each power transfer winding comprises causing the injection stage to compensate for one or more of the power transfer windings being driven high.

8. The method of claim 1, further comprising disabling the injection stage in response to a signal indicating that the switching power converter is experiencing a transient event.

9. The method of claim 1, further comprising controlling the injection stage to change timing of switching of the injection stage in response to a signal indicating that the switching power converter is experiencing a transient event.

10. The method of claim 1, wherein the at least one parameter of the switching power converter comprises one of magnitude of a voltage and magnitude of a current.

11. The method of claim 1, wherein the plurality of power transfer windings and the injection winding are part of a common coupled inductor.

12. The method of claim 1, wherein the switching power converter has a topology selected from the group consisting of a multi-phase buck-type topology, a multi-phase boost-type topology, and a multi-phase buck-boost-type topology.

13. The method of claim 1, wherein two or more of the plurality of power stages are part of different respective power sub-converters.

14. A method for operating a switching power converter to reduce ripple current magnitude, comprising:

controlling duty cycle of a power stage of the switching power converter to regulate at least one parameter of the switching power converter, the power stage including a power transfer winding; and controlling an injection stage of the switching power converter to reduce voltage across a leakage inductance of the power transfer winding, the injection stage including an injection winding that is magnetically coupled to the power transfer winding.

15. A switching power converter, comprising:

a plurality of power stages, each power stage including a respective power transfer winding that is magnetically coupled to the respective power transfer winding of each other power stage;

an injection stage including an injection winding that is magnetically coupled to each power transfer winding; and a controller configured to:
control duty cycle of the plurality power stages to regulate at least one parameter of the switching power converter, and
control the injection stage to reduce voltage across a respective leakage inductance of each power transfer winding.

16. The switching power converter of claim 15, wherein the controller is further configured to control the injection stage to reduce voltage across the respective leakage inductance of each power transfer winding at least partially by causing the injection winding to be driven high in response to a power transfer winding being driven low.

17. The switching power converter of claim 15, wherein the controller is further configured to control the injection stage to reduce voltage across the respective leakage inductance of each power transfer winding at least partially by causing the injection winding to be driven high in response to one of the power transfer windings being driven low while at least one of the remaining power transfer windings are driven high.

18. The switching power converter of claim 15, wherein the controller is further configured to control the injection stage to reduce voltage across the respective leakage inductance of each power transfer winding at least partially by causing the injection winding to be driven high in response to one of the power transfer windings being driven high.

19. The switching power converter of claim 15, wherein the plurality of power transfer windings and the injection winding are part of a common coupled inductor.

20. The switching power converter of claim 19, wherein the coupled inductor is asymmetrical.

* * * * *